US012682840B2

(12) United States Patent
Park et al.

(10) Patent No.: US 12,682,840 B2
(45) Date of Patent: Jul. 14, 2026

(54) DISPLAY DEVICE

(71) Applicant: SAMSUNG DISPLAY CO., LTD., Yongin-si (KR)

(72) Inventors: Junhyun Park, Yongin-si (KR); Hyeongseok Kim, Yongin-si (KR); Heejean Park, Yongin-si (KR); Sunhwa Lee, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/185,207

(22) Filed: Apr. 21, 2025

(65) Prior Publication Data

US 2025/0252910 A1 Aug. 7, 2025

Related U.S. Application Data

(63) Continuation of application No. 18/491,568, filed on Oct. 20, 2023, now Pat. No. 12,283,230.

(30) Foreign Application Priority Data

Jan. 11, 2023 (KR) ........................ 10-2023-0003979

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2330/06* (2013.01)

(58) Field of Classification Search
CPC .. G09G 3/3648; G09G 3/3655; G09G 3/3677; G09G 3/3233; G09G 3/3688; G09G 2300/0426; G09G 2300/0876; G09G 2300/0842; G09G 2300/0443; G09G 2300/0819; G09G 2300/0408; G09G 2330/021; G09G 2320/0223; G09G 2320/0247; G09G 2320/0209; G09G 2320/0233; G09G 2320/43
See application file for complete search history.

(56) References Cited

U.S. PATENT DOCUMENTS

| | | | |
|---|---|---|---|
| 2013/0153941 | A1 | 6/2013 | Sasaki et al. |
| 2017/0141177 | A1 | 5/2017 | Kim et al. |
| 2018/0061922 | A1 | 3/2018 | Kim et al. |

(Continued)

FOREIGN PATENT DOCUMENTS

| | | |
|---|---|---|
| KR | 10-2022-0042007 | 4/2022 |
| KR | 10-2022-0130277 | 9/2022 |

*Primary Examiner* — Dong Hui Liang
(74) *Attorney, Agent, or Firm* — Womble Bond Dickinson (US) LLP

(57) ABSTRACT

A display device includes: an active layer on a substrate; a first switching transistor including a part of the active layer; a second switching transistor including a part of the active layer and in a same plane as at least a part of the first switching transistor in a first direction in a plan view; a first capacitor on the active layer and connected to the second switching transistor; a second capacitor on the active layer and connected to the first switching transistor; a first gate line extending in the first direction and connected to a gate electrode of each of the first and second switching transistors; and a light emitting element on the first gate line.

20 Claims, 18 Drawing Sheets

(56) References Cited

U.S. PATENT DOCUMENTS

| | | | | |
|---|---|---|---|---|
| 2020/0111413 | A1 | 4/2020 | Park et al. | |
| 2020/0119115 | A1 | 4/2020 | Moon et al. | |
| 2020/0119126 | A1* | 4/2020 | Jo | H10K 59/126 |
| 2022/0208804 | A1* | 6/2022 | Jang | H10W 90/00 |
| 2023/0131089 | A1* | 4/2023 | Lee | H10D 86/60 345/690 |

* cited by examiner

AL+CL1+CL2+CL3

AL+CL1+CL2+CL3+CL4

DISPLAY DEVICE

CROSS-REFERENCE TO RELATED APPLICATIONS

This application is a continuation of U.S. patent application Ser. No. 18/491,568, filed Oct. 20, 2023, which claims priority to and the benefit of Korean Patent Application No. 10-2023-0003979, filed Jan. 11, 2023, the entire content of both of which is incorporated herein by reference.

BACKGROUND

1. Field

Aspects of some embodiments include a display device.

2. Description of the Related Art

With the development of information technology, the importance of display devices, which provides a connection medium between a user and information, has been highlighted. For example, the use of display devices such as liquid crystal display devices, organic light emitting display devices, plasma display devices, and the like is increasing.

The above information disclosed in this Background section is only for enhancement of understanding of the background and therefore the information discussed in this Background section does not necessarily constitute prior art.

SUMMARY

Aspects of some embodiments include a display device. For example, aspects of some embodiments relate generally to a display device that provides visual information.

Aspects of some embodiments include a display device with relatively improved generation of static electricity.

A display device according to some embodiments of the present disclosure includes an active layer on a substrate, a first switching transistor including a part of the active layer, a second switching transistor including a part of the active layer and in a same plane as at least a part of the first switching transistor in a first direction in a plan view, a first capacitor on the active layer and connected to the second switching transistor, a second capacitor on the active layer and connected to the first switching transistor, a first gate line extending in the first direction and connected to a gate electrode of each of the first and second switching transistors, and a light emitting element on the first gate line.

According to some embodiments, the active layer may continuously extend on the substrate.

According to some embodiments, a compensation gate signal may be applied to the first gate line.

According to some embodiments, the first capacitor may be a storage capacitor and the second capacitor may be a hold capacitor.

According to some embodiments, the first gate line may be adjacent to the first and second capacitors.

According to some embodiments, the active layer may include an active pattern partially overlapping the first and second capacitor, a first extension part connected to the active pattern, and a second extension part connected to the active pattern and spaced apart from the first extension part in the first direction. The first switching transistor may include a part of the first extension part and the second switching transistor includes a part of the second extension part.

According to some embodiments, the first gate line may partially overlap each of the first and second extension parts.

According to some embodiments, the display device may further include a second gate line adjacent to the first gate line and extending in the first direction and a third gate line adjacent to the second gate line and extending in the first direction. The second and third gate lines may partially overlap the first and second extension parts, respectively.

According to some embodiments, the display device may further include a third switching transistor including a part of the first extension part and a fourth switching transistor including a part of the second extension part. The second gate line may be connected to a gate electrode of the third switching transistor and the third gate line may be connected to a gate electrode of the fourth switching transistor. A data write signal may be applied to the second gate line and a data initialization gate signal may be applied to the third gate line.

According to some embodiments, the display device may further include a transfer line in a peripheral area surrounding at least a part of a display area of the substrate, extending in a second direction crossing the first direction, and to which a DC power supply voltage is applied. The active layer may be connected to the transfer line in the first direction.

A display device according to some embodiments of the present disclosure includes an active layer on a substrate, a first switching transistor including a part of the active layer, a second switching transistor including a part of the active layer and in a same plane as at least a part of the first switching transistor in a first direction in a plan view, a first conductive pattern on the active layer, a second conductive pattern partially overlapping the first conductive pattern and constituting a first capacitor together with the first conductive pattern, a third conductive pattern partially overlapping the second conductive pattern and constituting a second capacitor together with the second conductive pattern, a first gate line on third conductive pattern, extending in the first direction, and connected to a gate electrode of each of the first and second switching transistors, and a light emitting element on the first gate line.

According to some embodiments, a compensation gate signal may be applied to the first gate line.

According to some embodiments, the first capacitor may be a storage capacitor and the second capacitor may be a hold capacitor.

According to some embodiments, the first gate line may be adjacent to the first and second capacitors.

According to some embodiments, the active layer may include an active pattern partially overlapping the first and second capacitor, a first extension part connected to the active pattern, and a second extension part connected to the active pattern and spaced apart from the first extension part in the first direction. The first switching transistor may include a part of the first extension part and the second switching transistor includes a part of the second extension part.

According to some embodiments, the first gate line may partially overlap each of the first and second extension parts.

According to some embodiments, the display device may further include a second gate line adjacent to the first gate line and extending in the first direction and a third gate line adjacent to the second gate line and extending in the first direction. The second and third gate lines may partially overlap the first and second extension parts, respectively.

According to some embodiments, the display device may further include a third switching transistor including a part of the first extension part and a fourth switching transistor including a part of the second extension part. The second gate line may be connected to a gate electrode of the third switching transistor and the third gate line may be connected to a gate electrode of the fourth switching transistor. A data write signal may be applied to the second gate line and a data initialization gate signal may be applied to the third gate line.

A display device according to some embodiments of the present disclosure includes an active layer on a substrate, a first switching transistor including a part of the active layer, a second switching transistor including a part of the active layer and in a same plane as at least a part of the first switching transistor in a first direction in a plan view, a first conductive pattern on the active layer, a second conductive pattern partially overlapping the first conductive pattern and constituting a first capacitor together with the first conductive pattern, a third conductive pattern partially overlapping the second conductive pattern and constituting a second capacitor together with the second conductive pattern, a first gate line on third conductive pattern, extending in the first direction, and connected to a gate electrode of each of the first and second switching transistors, a first lower source pattern in a same layer as the first gate line, connected to the first conductive pattern through a first contact hole, and connected to a part of the active layer that does not overlap with the first, second, and third conductive patterns through a second contact hole, a second lower source pattern in a same layer as the first gate line, connected to the second conductive pattern through a third contact hole, and connected to a part of the active layer that does not overlap with the first, second, and third conductive patterns through a fourth contact hole, and a light emitting element on the first gate line.

According to some embodiments, a part of the active layer and a part of the first conductive pattern overlapping the active layer may constitute a driving transistor.

A display device according to some embodiments of the present disclosure may include an active layer continuously extending on a substrate, a first switching transistor including a part of the active layer, a second switching transistor including a part of the active layer and in a same plane as at least a part of the first switching transistor in a first direction in a plan view, and a gate line extending in the first direction, connected to a gate electrode of each of the first and second switching transistors, and to which a compensation gate signal is applied. That is, one gate line may be provided for each pixel circuit. Accordingly, deterioration of characteristics of a transistor due to generation of static electricity may be prevented. In addition, the display device having a high resolution may be implemented.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
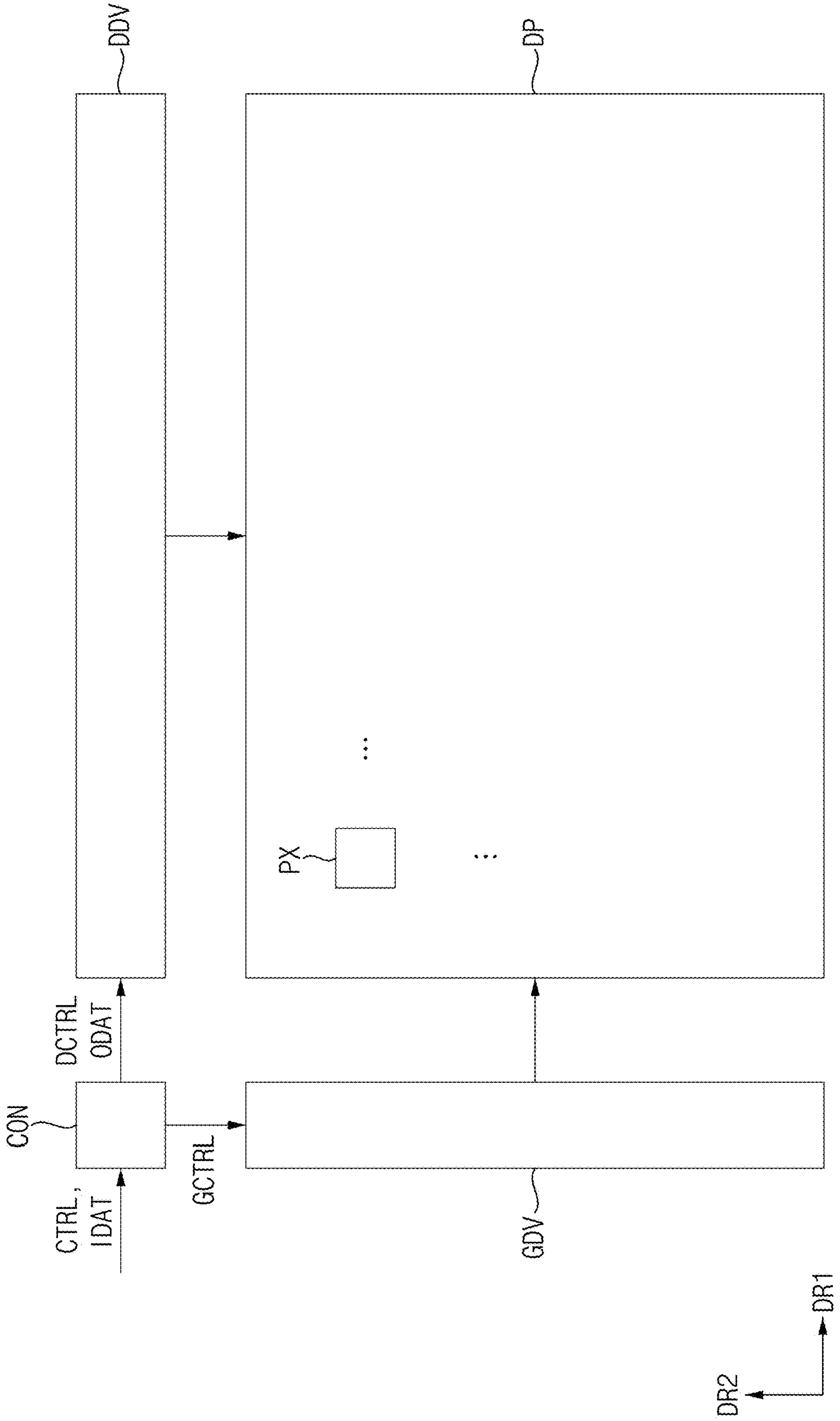
FIG. 1 is a plan view illustrating a display device according to some embodiments of the present disclosure.

Hereinafter, a display device according to some embodiments of the present disclosure will be explained in detail with reference to the accompanying drawings. The same reference numerals are used for the same components in the drawings, and redundant descriptions of the same components will be omitted.

FIG. 1 is a plan view illustrating a display device according to some embodiments of the present disclosure.

Referring to FIG. 1, a display device DD according to some embodiments of the present disclosure may include a display panel DP, a data driver DDV, a gate driver GDV, and a timing controller CON.

The display device DD may display images through the display panel DP. For example, the display panel DP may include a plurality of pixels PX each including a transistor and a light emitting element electrically connected to the transistor. The light emitting element may emit light by receiving a signal from the driving element. As such, the display device DD may display images by emitting light from the plurality of pixels PX.

One pixel PX may display one predetermined basic color (e.g., red, green, blue, white, etc.). In other words, one pixel PX may be a minimum unit capable of displaying colors independent of the other pixels PX. For example, one pixel PX may display any one color among red, green, and blue.

The pixels PX may be arranged in a matrix arrangement along a first direction DR1 and a second direction DR2 crossing the first direction DR1. For example, the first direction DR1 and the second direction DR2 may be perpendicular to each other.

The timing controller CON may generate a gate control signal GCTRL, a data control signal DCTRL, and an output image data ODAT based on a control signal CTRL and an input image data IDAT provided from an external source. For example, the control signal CTRL may include a vertical synchronization signal, a horizontal synchronization signal, an input data enable signal, a master clock signal, and the like. For example, the input image data IDAT may be RGB data including red image data, green image data, and blue image data. Alternatively, the input image data IDAT may include magenta image data, cyan image data, and yellow image data.

The gate driver GDV may generate gate signals based on the gate control signal GCTRL provided from the timing controller CON. For example, the gate control signal GCTRL may include a vertical start signal, a clock signal, and the like. For example, the gate driver GDV may be manufactured as a separate panel and connected to the display panel DP. The gate driver GDV may be electrically connected to the display panel DP and may sequentially output the gate signals. Each of the plurality of pixels PX may receive data voltages from the data driver DDV according to the control of each of the gate signals.

The data driver DDV may generate the data voltages based on the data control signal DCTRL and the output image data ODAT provided from the timing controller CON. For example, the data control signal DCTRL may include an output data enable signal, a horizontal start signal, a load signal, and the like. For example, the data driver DDV may be manufactured as a separate panel and electrically connected to the display panel DP. Each of the plurality of pixels PX may transmit a luminance signal corresponding to each of the data voltages to the light emitting element.

Figure 2:
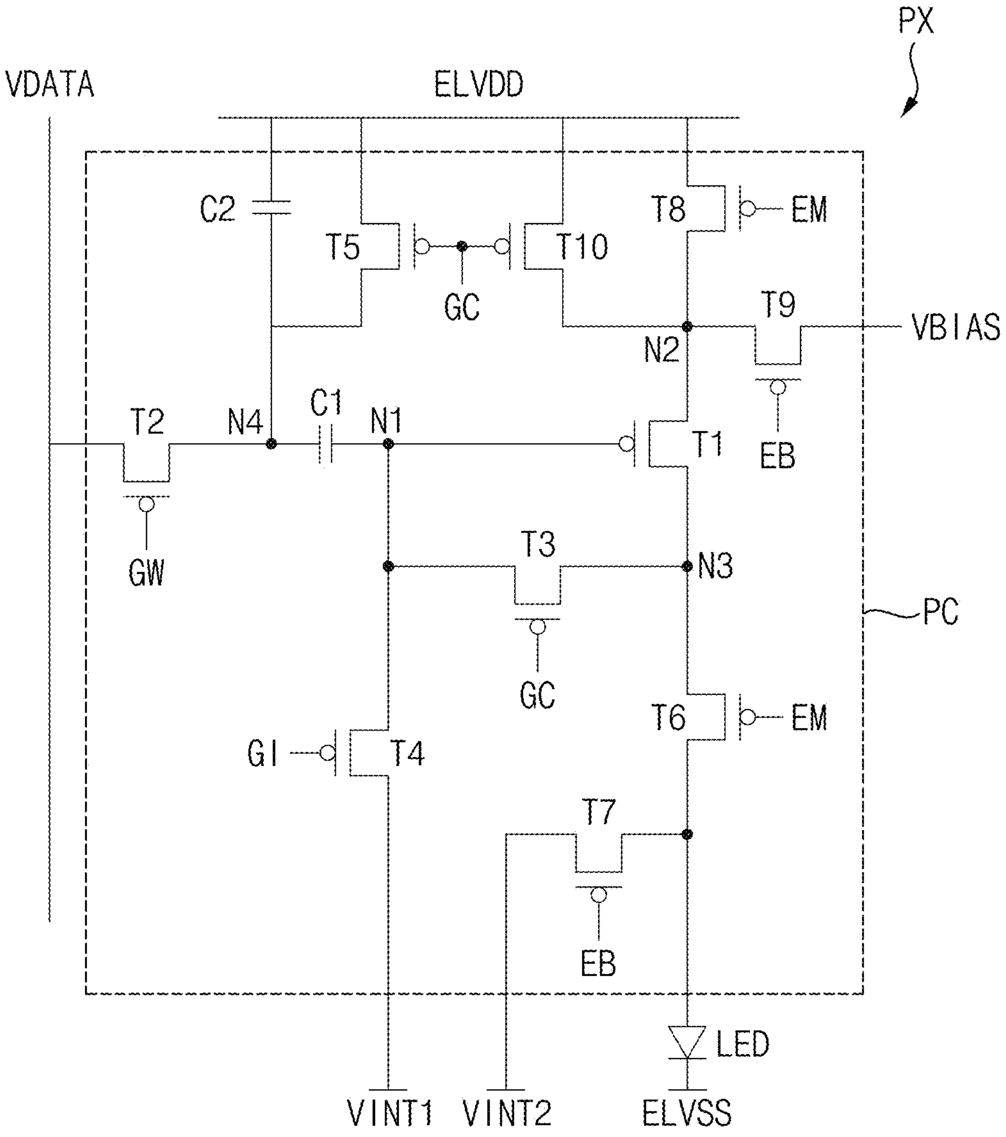
FIG. 2 is a circuit diagram illustrating an example of a pixel included in a display panel of FIG. 1.

FIG. 2 is a circuit diagram illustrating an example of a pixel included in a display panel of FIG. 1.

Referring to FIG. 2, each pixel PX may include a pixel circuit PC and a light emitting element LED electrically connected to the pixel circuit PC. Here, the pixel circuit PC may include first, second, third, fourth, fifth, sixth, seventh, eighth, ninth, and tenth transistors T1, T2, T3, T4, T5, T6, T7, T8, T9, and T10, a first capacitor C1 and a second capacitor C2.

The first transistor T1 may include a first electrode, a second electrode, and a gate electrode. The gate electrode of the first transistor T1 may be connected to a first node N1. A first electrode of the first transistor T1 may be connected to a second node N2. The second electrode of the first transistor T1 may be connected to a third node N3. The first transistor T1 may be referred to as a driving transistor.

The first transistor T1 may generate a driving current based on a difference between a data voltage VDATA and a driving voltage ELVDD. The first transistor T1 may provide the driving current to the light emitting element LED.

The second transistor T2 may include a first electrode, a second electrode, and a gate electrode. A data write signal GW may be applied to the gate electrode of the second transistor T2. The data voltage VDATA may be applied to the first electrode of the second transistor T2. The second electrode of the second transistor T2 may be connected to the fourth node N4. The second transistor T2 may provide the data voltage VDATA to a fourth node N4 in response to the data write signal GW.

As shown in FIG. 2, the second transistor T2 may have a single transistor structure. Alternatively, the second transistor T2 may have a dual transistor structure in which two transistors are serially connected to each other.

The third transistor T3 may include a first electrode, a second electrode, and a gate electrode. A compensation gate signal GC may be applied to the gate electrode of the third transistor T3. The first electrode of the third transistor T3 may be connected to the first node N1. The second electrode of the third transistor T3 may be connected to the third node N3. The third transistor T3 may compensate a threshold voltage of the first transistor T1 by diode-connecting the first transistor T1 in response to the compensation gate signal GC.

As shown in FIG. 2, the third transistor T3 may have a single transistor structure. Alternatively, the third transistor T3 may have a dual transistor structure in which two transistors are serially connected to each other.

The fourth transistor T4 may include a first electrode, a second electrode, and a gate electrode. A data initialization gate signal GI may be applied to the gate electrode of the fourth transistor T4. A first initialization voltage VINT1 may be applied to the first electrode of the fourth transistor T4. The second electrode of the fourth transistor T4 may be connected to the first node N1. The fourth transistor T4 may provide the first initialization voltage VINT1 to the gate electrode of the first transistor T1 in response to the data initialization gate signal GI.

As shown in FIG. 2, the fourth transistor T4 may have a single transistor structure. Alternatively, the fourth transistor T4 may have a dual transistor structure in which two transistors are connected in series.

The fifth transistor T5 may include a first electrode, a second electrode, and a gate electrode. The compensation gate signal GC may be applied to the gate electrode of the fifth transistor T5. A high power supply voltage ELVDD may be applied to the first electrode of the fifth transistor T5. The second electrode of the fifth transistor T5 may be connected to the fourth node N4. Alternatively, a reference voltage may be applied to the first electrode of the fifth transistor T5.

As shown in FIG. 2, the fifth transistor T5 may have a single transistor structure. Alternatively, the fifth transistor T5 may have a dual transistor structure in which two transistors are serially connected to each other.

The sixth transistor T6 may include a first electrode, a second electrode, and a gate electrode. A light emitting control signal EM may be applied to the gate electrode of the sixth transistor T6. The first electrode of the sixth transistor T6 may be connected to the third node N3. The second electrode of the sixth transistor T6 may be connected to an anode electrode of the light emitting element LED. The sixth transistor T6 may provide the driving current generated in the first transistor T1 to the light emitting element LED in response to the light emitting control signal EM.

The seventh transistor T7 may include a first electrode, a second electrode, and a gate electrode. An initialization gate signal EB may be applied to the gate electrode of the seventh transistor T7. A second initialization voltage VINT2 may be applied to the first electrode of the seventh transistor T7. The second electrode of the seventh transistor T7 may be connected to the anode electrode of the light emitting element LED. The seventh transistor T7 may provide the second initialization voltage VINT2 to the anode electrode of the light emitting element LED in response to the initialization gate signal EB.

The eighth transistor T8 may include a first electrode, a second electrode, and a gate electrode. The light emitting control signal EM may be applied to the gate electrode of the eighth transistor T8. The high power supply voltage ELVDD may be applied to the first electrode of the eighth transistor T8. The second electrode of the eighth transistor T8 may be connected to the second node N2. The eighth transistor T8 may provide the driving current generated in the first transistor T1 to the light emitting element LED in response to the light emitting control signal EM.

The ninth transistor T9 may include a first electrode, a second electrode, and a gate electrode. The initialization gate signal EB may be applied to the gate electrode of the ninth transistor T9. A bias voltage VBIAS may be applied to the first electrode of the ninth transistor T9. The second electrode of the ninth transistor T9 may be connected to the second node N2. The ninth transistor T9 may provide the bias voltage VBIAS to the second node N2 in response to the initialization gate signal EB.

The tenth transistor T10 may include a first electrode, a second electrode, and a gate electrode. The compensation gate signal GC may be applied to the gate electrode of the tenth transistor T10. The high power supply voltage ELVDD may be applied to the first electrode of the tenth transistor T10. The second electrode of the tenth transistor T10 may be connected to the second node N2.

Each of the second, third, fourth, fifth, sixth, seventh, eighth, ninth, and tenth transistors T2, T3, T4, T5, T6, T7, T8, T9, and T10 may be referred to as a switching transistor.

The first capacitor C1 may include a first electrode and a second electrode. The first electrode of the first capacitor C1 may be connected to the fourth node N4. The second electrode of the first capacitor C1 may be connected to the first node N1. According to some embodiments, the first capacitor C1 may be a storage capacitor.

The second capacitor C2 may include a first electrode and a second electrode. The high power supply voltage ELVDD may be applied to the first electrode of the second capacitor C2. The second electrode of the second capacitor C2 may be connected to the fourth node N4. According to some embodiments, the second capacitor C2 may be a hold capacitor.

The light emitting element LED may include the anode electrode and a cathode electrode. The anode electrode of the light emitting element LED may be connected to the second electrode of the seventh transistor T7. A low power supply voltage ELVSS may be applied to the cathode electrode of the light emitting element LED. The voltage level of the low power supply voltage ELVSS may be lower than the voltage level of the high power supply voltage ELVDD. The light emitting element LED may emit light based on the driving current. However, although the pixel circuit PC has been described as including ten transistors and two capacitors, embodiments of the present disclosure are not limited thereto.

For example, the tenth transistor T10 may be omitted, a first light emitting control signal may be applied to the gate electrode of the sixth transistor T6, and a second light emitting control signal different from the first light emitting control signal may be applied to the gate electrode of the eighth transistor T8.

For example, the eighth transistor T8, the ninth transistor T9, and the tenth transistor T10 may be omitted. Additionally, according to some embodiments of the present disclosure, the pixel circuit PC may include additional components or fewer components without departing from the spirit and scope of embodiments according to the present disclosure.

Figure 3:
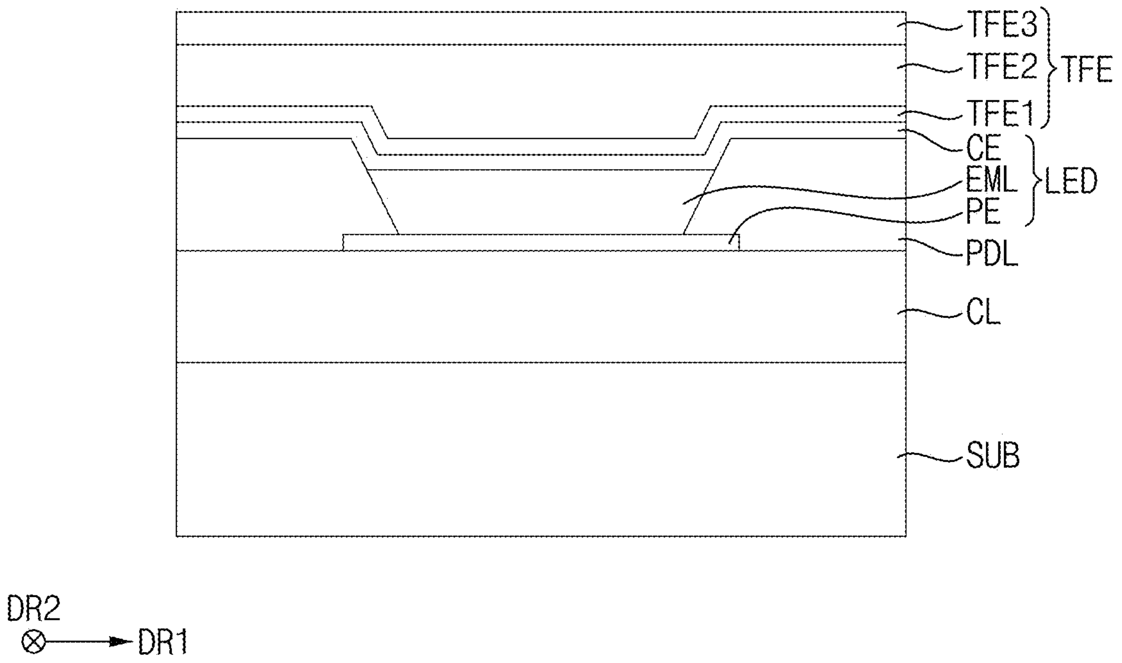
FIG. 3 is a schematic cross-sectional view of the display device of FIG. 1.

FIG. 3 is a schematic cross-sectional view of the display device of FIG. 1. For example, FIG. 3 is a cross-sectional view schematically illustrating an example of a cross-section of one pixel PX of FIG. 1.

Referring to FIG. 3, the display device DD according to some embodiments may include a substrate SUB, a circuit layer CL, the light emitting element LED, a pixel defining layer PDL, and an encapsulation layer TFE.

The substrate SUB may include a transparent material or an opaque material. The substrate SUB may be made of a transparent resin substrate. Examples of the transparent resin substrate include polyimide substrates and the like. In this case, the polyimide substrate may include a first organic layer, a first barrier layer, a second organic layer, and the like. Alternatively, the substrate SUB may include a quartz substrate, a synthetic quartz substrate, a calcium fluoride substrate, an F-doped quartz substrate, a soda-lime glass substrate, a non-alkali glass substrate, and the like. These may be used alone or in combination with each other.

The circuit layer CL may be located on the substrate SUB. The circuit layer CL may provide signals and voltages for the light emitting element LED to emit light to the light emitting element LED. For example, the circuit layer CL may include a transistor, a conductive layer, an insulating layer, and the like. The circuit layer CL may correspond to the pixel circuit PC of FIG. 2.

A pixel electrode PE may be located on the circuit layer CL. The pixel electrode PE may receive the signals and the voltages from the circuit layer CL. For example, the pixel electrode PE may include a metal, an alloy, a metal nitride, a conductive metal oxide, a transparent conductive material, and the like. These may be used alone or in combination with each other. For example, the pixel electrode PE may be an anode electrode. Alternatively, the pixel electrode PE may be a cathode electrode.

The pixel defining layer PDL may be located on the circuit layer CL and the pixel electrode PE. An opening exposing at least a part of an upper surface of the pixel electrode PE may be defined in the pixel defining layer PDL. By defining the opening in the pixel defining layer PDL, the pixel defining layer PDL may define the pixel PX that emits light. The pixel defining layer PDL may include an organic material and/or an inorganic material. For example, the pixel defining layer PDL may include an organic material such as photoresist, polyacrylic resin, polyimide resin, polyamide resin, siloxane resin, acrylic resin, epoxy resin, and the like. These may be used alone or in combination with each other.

A light emitting layer EML may be located on the pixel electrode PE. For example, the light emitting layer EML may be located within the opening of the pixel defining layer PDL. The light emitting layer EML may include materials for emitting light. For example, the light emitting layer EML may include an organic light emitting material and/or an inorganic light emitting material.

The common electrode CME may be located on the pixel defining layer PDL and the light emitting layer EML. For example, the common electrode CME may include a metal, an alloy, a metal nitride, a conductive metal oxide, a transparent conductive material, and the like. These may be used alone or in combination with each other. For example, the common electrode CME may be a cathode electrode. Alternatively, the common electrode CME may be an anode electrode.

Accordingly, the light emitting element LED including the pixel electrode PE, the light emitting layer EML, and the common electrode CME may be located on the substrate SUB.

The encapsulation layer TFE may be located on the common electrode CME. The encapsulation layer TFE may protect the light emitting element LED from external oxygen and moisture. The encapsulation layer TFE may include at least one inorganic layer and at least one organic layer. For example, the encapsulation layer TFE may include the first inorganic layer TFE1 located on the common electrode CME, the organic layer TFE2 located on the first inorganic layer TFE1, and the second inorganic layer TFE3 located on the organic layer TFE2.

FIGS. 4, 5, 6, 7, 8, 9, 10, 11, 12, 13, and 14 are layout views for explaining one pixel of the display device of FIGS. 1 and 2. For example, FIG. 14 may be an example of a layout view illustrating the circuit layer CL of FIG. 3. Although the components shown in FIGS. 4, 5, 6, 7, 8, 9, 10, 11, 12, 13, and 14 are illustrated based on one pixel circuit PC, the components shown in FIGS. 4, 5, 6, 7, 8, 9, 10, 11, 12, 13, and 14 may be equally located in each pixel circuit PC. At least some of the components shown in FIGS. 4, 5, 6, 7, 8, 9, 10, 11, 12, 13, and 14 may be connected to each other among the plurality of pixel circuits PC.

Figure 4:
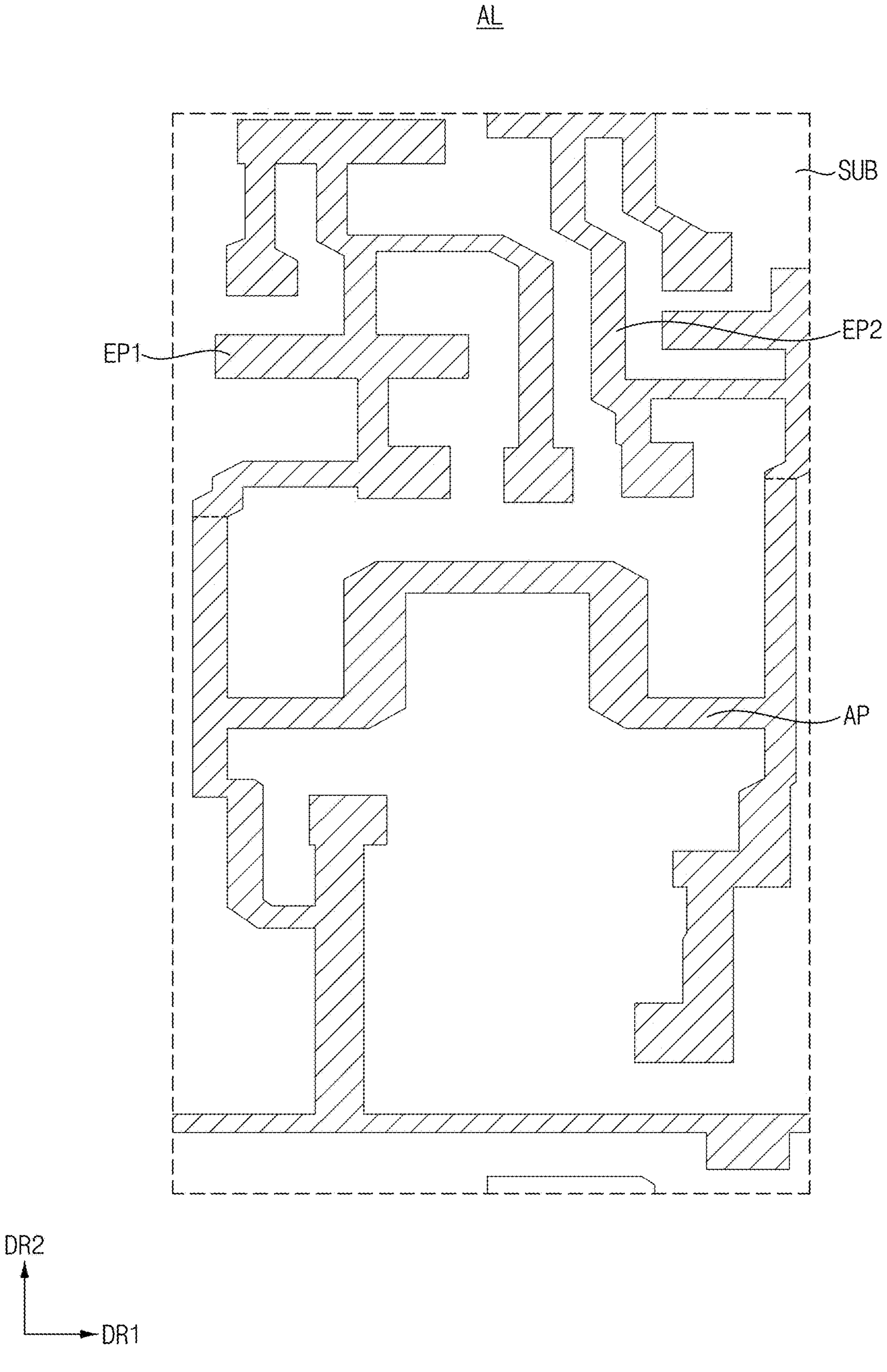
FIGS. 4, 5, 6, 7, 8, 9, 10, 11, 12, 13, and 14 are layout views for explaining one pixel of the display device of FIGS. 1 and 2.

Referring to FIG. 4, the display device DD according to some embodiments may include an active layer AL located on a substrate SUB. For example, a buffer layer may be located on the substrate SUB, and the active layer AL may be located on the buffer layer.

The active layer AL may include an active pattern AP, a first extension part EP1 and a second extension part EP2. The active pattern AP, the first extension part EP1 and the second extension part EP2 may be located in the same layer and include the same material.

According to some embodiments, the active layer AL may continuously extend (e.g., as a contiguous layer). That is, the active pattern AP, the first extension part EP1 and the second extension part EP2 may not be disconnected from each other.

For example, the first extension part EP1 may be connected to the active pattern AP and may be adjacent to the active pattern AP in the second direction DR2. The second extension part EP2 may be connected to the active pattern AP and may be adjacent to the active pattern AP in the second direction DR2. The first extension part EP1 and the second extension part EP2 may be spaced apart from each other. For example, the first extension part EP1 and the second extension part EP2 may be spaced apart from each other in the first direction DR1.

The active layer AL may include a metal oxide semiconductor (e.g., indium gallium zinc oxide (IGZO)), an inorganic semiconductor (e.g., amorphous silicon, poly silicon), or an organic semiconductor.

Figure 5:
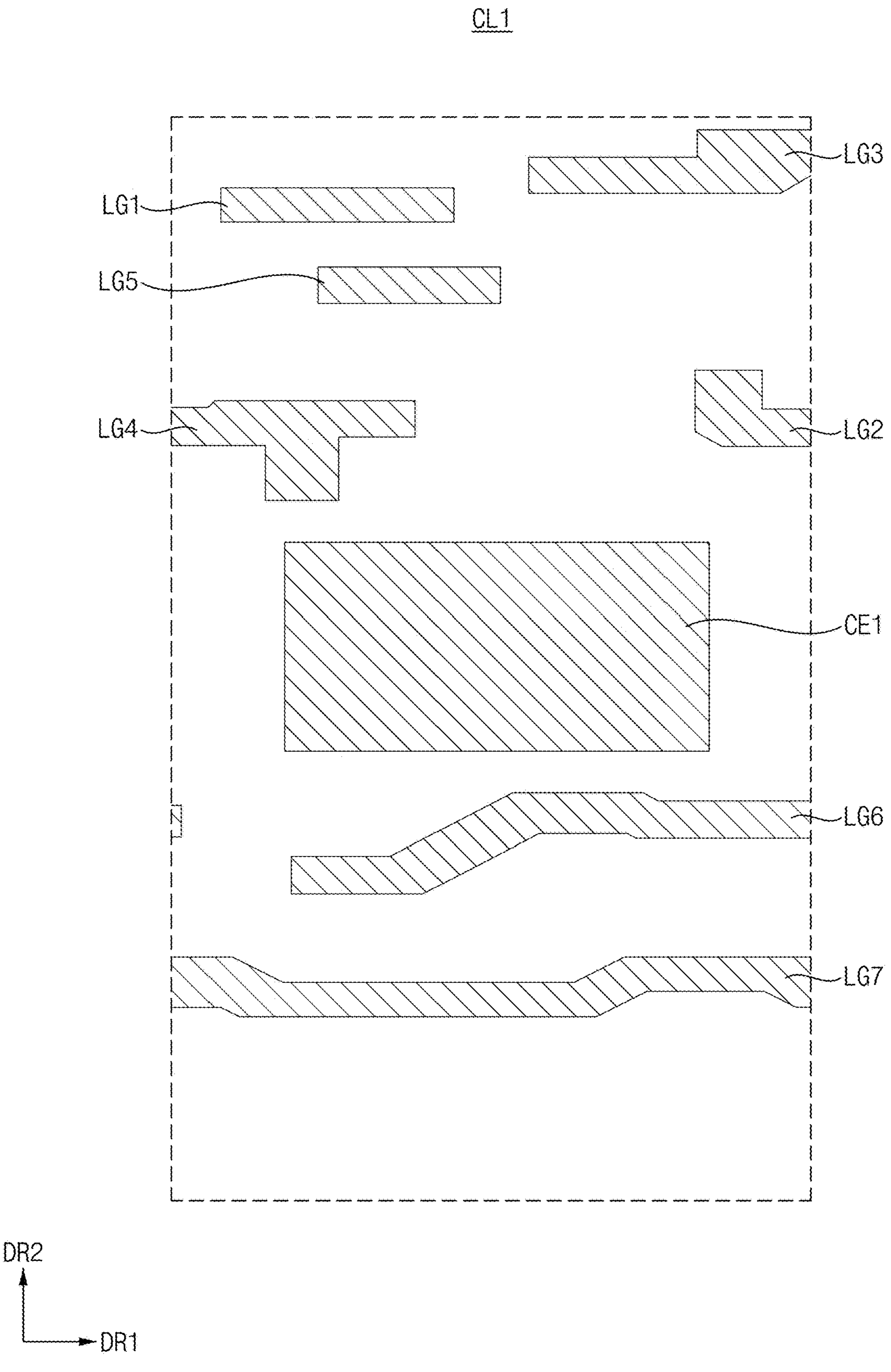

Further referring to FIG. 5, the display device DD according to some embodiments of the present disclosure may further include a first conductive layer CL1. The first conductive layer CL1 may be located on the active layer AL. For example, a first insulating layer covering the active layer AL may be located on the active layer AL, and the first conductive layer CL1 may be located on the first insulating layer.

The first conductive layer CL1 may include first, second, third, fourth, fifth, sixth, and seventh lower gate patterns LG1, LG2, LG3, LG4, LG5, LG6, and LG7 and a first conductive pattern CE1. The first, second, third, fourth, fifth, sixth, and seventh lower gate patterns LG1, LG2, LG3, LG4, LG5, LG6, and LG7 and the first conductive pattern CE1 may be located in the same layer and may include the same material.

The second lower gate pattern LS2 positioned on a first pixel circuit may be integrally formed by being connected to the fourth lower gate pattern LS4 positioned on a second pixel circuit adjacent to the first pixel circuit.

The seventh lower gate pattern LG7 may extend in the first direction DR1. An initialization gate signal (e.g., the initialization gate signal EB of FIG. 2) may be applied to the seventh lower gate pattern LG7.

The first conductive pattern CE1 may have an island shape in a plan view.

The first conductive layer CL1 may include a metal, an alloy, a conductive metal oxide, a transparent conductive material, and the like. These may be used alone or in combination with each other.

Figure 6:
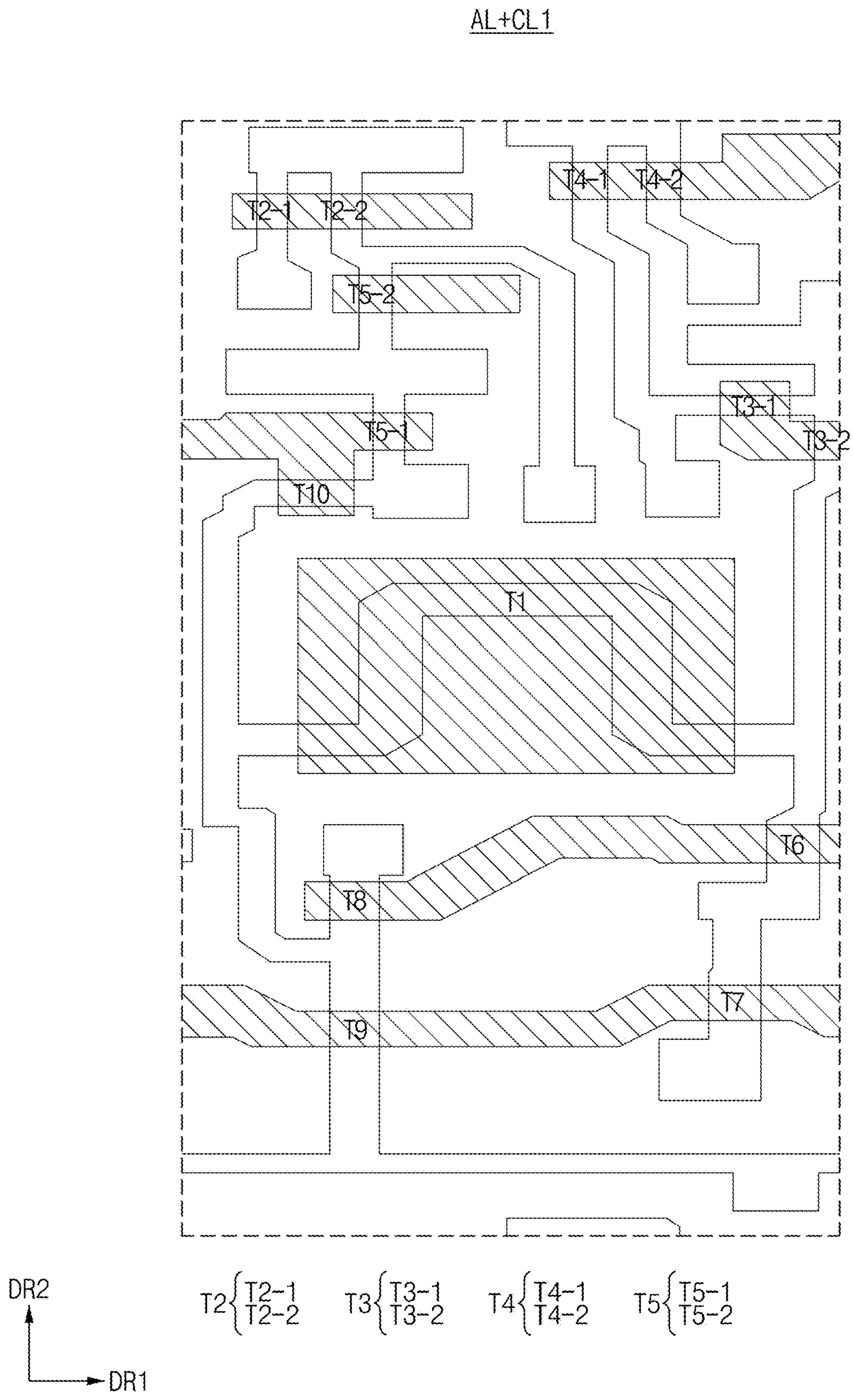

Further referring to FIG. 6, the first conductive layer CL1 and the active layer AL may at least partially overlap. An overlapping part between the first conductive layer CL1 and the active layer AL may constitute a part of a transistor.

A part of the active pattern AP and a part (i.e., a gate electrode) of the first conductive pattern CE1 overlapping the active pattern AP may constitute the first transistor T1.

A part of the first extension part EP1 and a part (i.e., a gate electrode) of the first lower gate pattern LG1 overlapping the first extension part EP1 may constitute the second transistor T2. Here, the second transistor T2 may include a (2-1)th transistor T2-1 and a (2-2)th transistor T2-2 connected in series with each other.

An overlapping part of the second lower gate pattern LG2 and the second extension part EP2 may constitute a part of the third transistor T3. Here, the third transistor T3 may include a (3-1)th transistor T3-1 and a (3-2)th transistor T3-2 connected in series with each other.

A part of the second extension part EP2 and a part (i.e., a gate electrode) of the third lower gate pattern LG3 overlapping the second extension part EP2 may constitute the fourth transistor T4. Here, the fourth transistor T4 may include a (4-1)th transistor T4-1 and a (4-2)th transistor T4-2 connected in series with each other.

A part of the first extension part EP1 and a part (i.e., a gate electrode) of the fourth lower gate pattern LG4 overlapping the first extension part EP1 may constitute a (5-1)th transistor T5-1. A part of the first extension part EP1 and a part (i.e., a gate electrode) of the fifth lower gate pattern LG5 overlapping the first extension part EP1 may constitute a (5-2)th transistor T5-2. Here, the (5-1)th transistor T5-1 and the (5-2)th transistor T5-2 may be serially connected to each other to constitute the fifth transistor T5.

According to some embodiments, in a plan view, at least a part of the fifth transistor T5 may be located on the same line as the third transistor T3 in the first direction DR1. For example, in the plan view, the (5-1)th transistor T5-1 may be located on the same line as the (3-2)th transistor T3-2 in the first direction DR1.

The active pattern AP and a part (i.e., a gate electrode) of a portion of the sixth lower gate pattern LG6 overlapping the active pattern AP may constitute the sixth transistor T6.

The active pattern AP and a part (i.e., a gate electrode) of a portion of the seventh lower gate pattern LG7 overlapping the active pattern AP may constitute the seventh transistor T7.

The active pattern AP and another part (i.e., a gate electrode) of the portion the sixth lower gate pattern LG6 overlapping the active pattern AP may constitute the eighth transistor T8.

The active pattern AP and another part (i.e., a gate electrode) of the portion of the seventh lower gate pattern LG7 overlapping the active pattern AP may constitute the ninth transistor T9.

The first extension part EP1 and another part (i.e., a gate electrode) of the portion of the fourth lower gate pattern LG4 overlapping the first extension part EP1 may constitute the tenth transistor T10.

Figure 7:
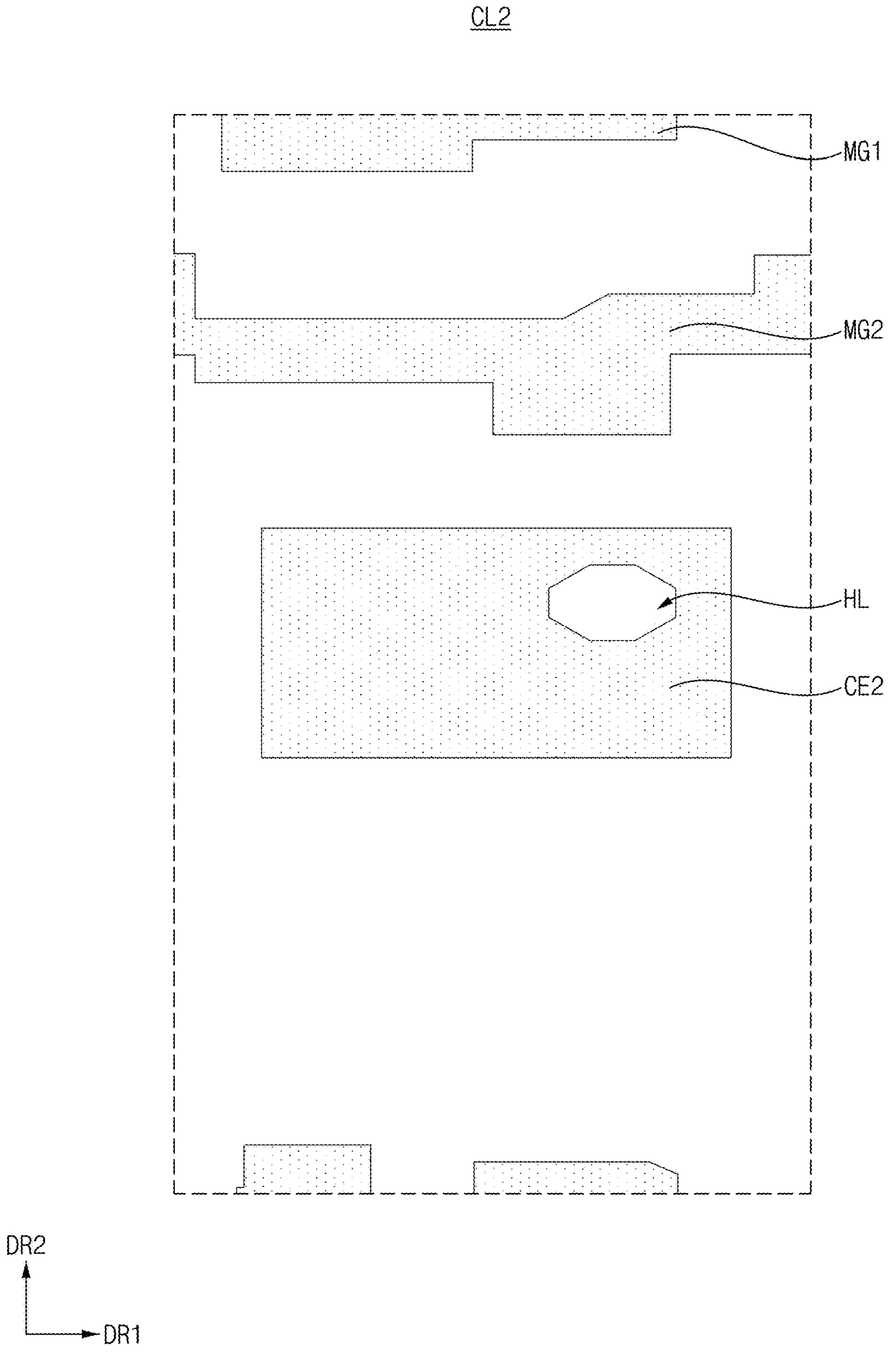
Figure 8:
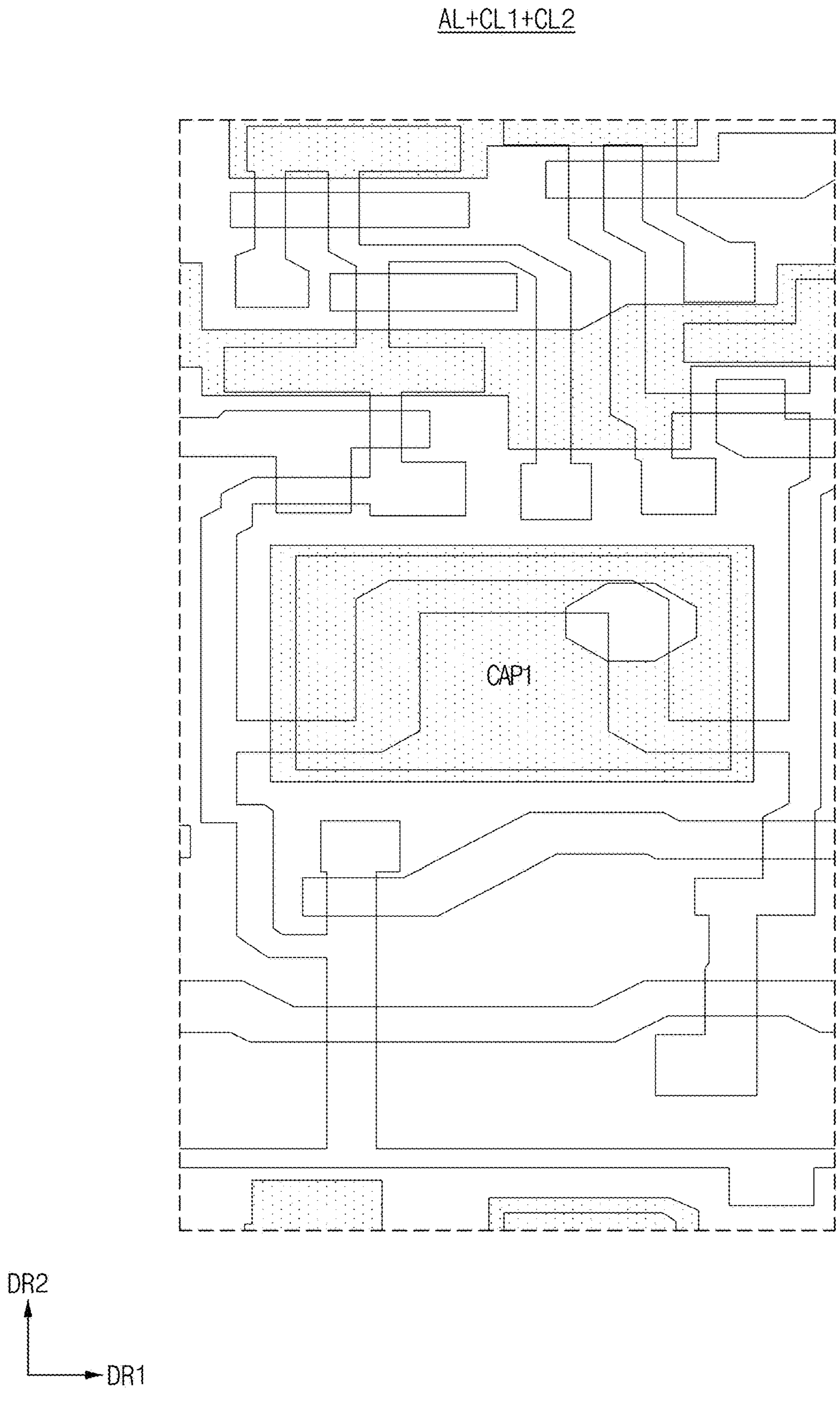

Further referring to FIGS. 7 and 8, the display device DD according to some embodiments of the present disclosure may further include a second conductive layer CL2. The second conductive layer CL2 may be located on the first conductive layer CL1. For example, a second insulating layer covering the first conductive layer CL1 may be located on the first conductive layer CL1, and the second conductive layer CL2 may be located on the second insulating layer.

The second conductive layer CL2 may include first and second intermediate gate patterns MG1 and MG2 and a second conductive pattern CE2. The first and second intermediate gate patterns MG1 and MG2 and the second conductive pattern CE2 may be located in the same layer and may include the same material.

The second intermediate gate pattern MG2 may extend in the first direction DR1. A first initialization voltage (e.g., the first initialization voltage VINT1 of FIG. 2) may be applied to the second intermediate gate pattern MG2. The second intermediate gate pattern MG2 may be referred to as an initialization voltage line.

A hole HL penetrating the second conductive pattern CE2 may be defined in the second conductive pattern CE2. The hole HL may overlap the first conductive pattern CE1. The second conductive pattern CE2 may partially overlap the first conductive pattern CE1. For example, the area of the second conductive pattern CE2 may be greater than the area of the first conductive pattern CE1.

The second conductive pattern CE2 and the first conductive pattern CE1 may constitute the first capacitor CAP1. The first capacitor CAP1 may correspond to the first capacitor C1 shown in FIG. 2. According to some embodiments, the first capacitor CAP1 may be a storage capacitor.

The second conductive layer CL2 may include a metal, an alloy, a conductive metal oxide, a transparent conductive material, and the like. These may be used alone or in combination with each other.

Figure 9:
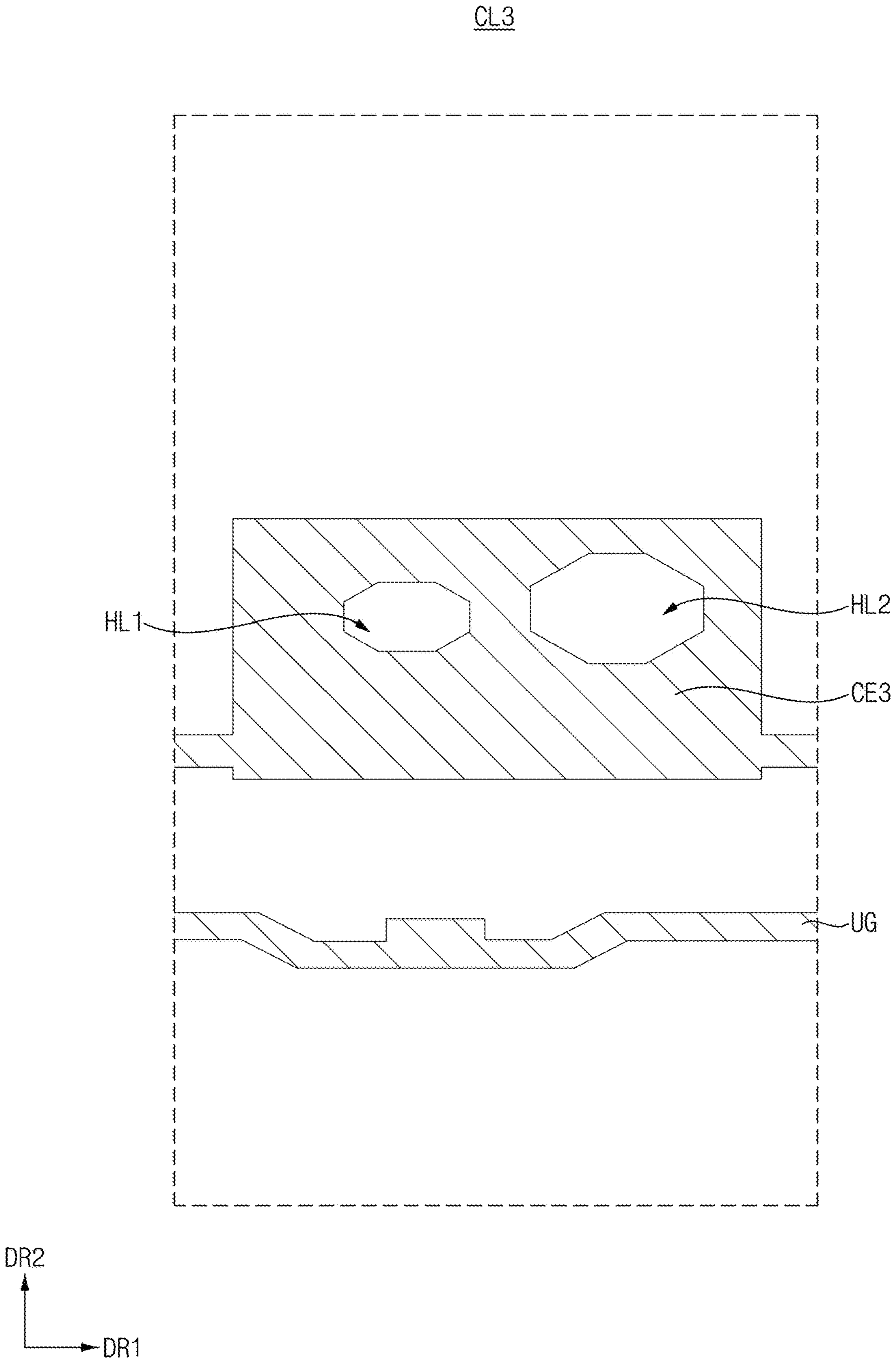
Figure 10:
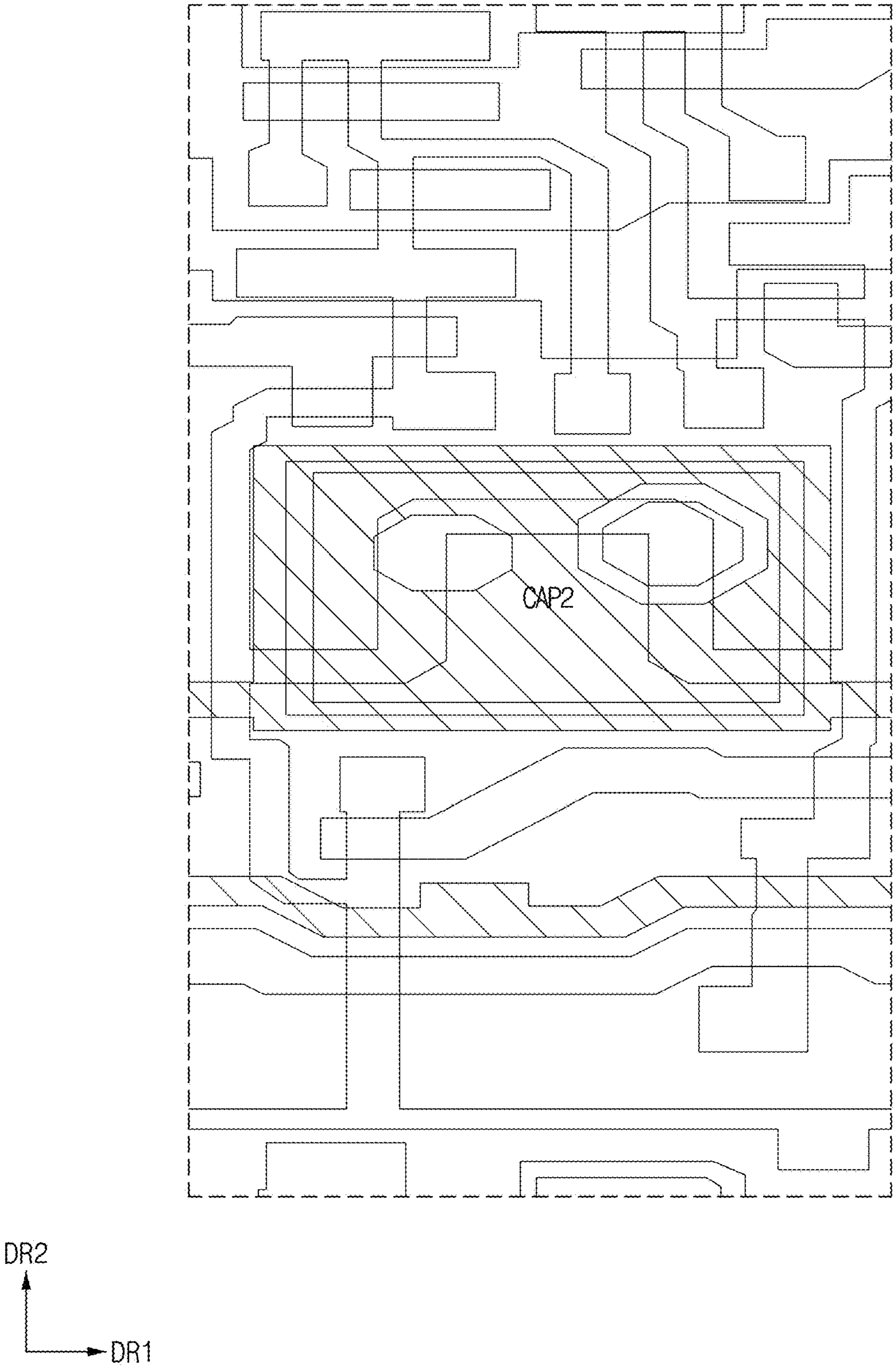

Further referring to FIGS. 9 and 10, the display device DD according to some embodiments of the present disclosure may further include a third conductive layer CL3. The third conductive layer CL3 may be located on the second conductive layer CL2. For example, a third insulating layer covering the second conductive layer CL2 may be located on the second conductive layer CL2, and the third conductive layer CL3 may be located on the third insulating layer.

The third conductive layer CL3 may include an upper gate pattern UG and a third conductive pattern CE3. The upper gate pattern UG and the third conductive pattern CE3 may be located in the same layer and include the same material.

The upper gate pattern UG may extend in the first direction DR1. The upper gate pattern UG may increase the yield of the display device DD. For example, when defects occur in some of the lines in the manufacturing process of the display device DD, the upper gate pattern UG may replace some of the lines.

A first hole HL1 and a second hole HL2 penetrating the third conductive pattern CE2 may be defined in the third conductive pattern CE3. The first hole HL1 and the second hole HL2 may overlap the first conductive pattern CE1 and the second conductive pattern CE2. In addition, the second hole HL2 may overlap the hole HL of the second conductive pattern CE2.

The third conductive pattern CE3 may partially overlap the second conductive pattern CE2. For example, the area of the third conductive pattern CE3 may be greater than the area of the second conductive pattern CE2.

The third conductive pattern CE3 and the second conductive pattern CE2 may form the second capacitor CAP2. The second capacitor CAP2 may correspond to the second capacitor C2 shown in FIG. 2. According to some embodiments, the second capacitor CAP2 may be a hold capacitor.

The third conductive layer CL3 may include a metal, an alloy, a conductive metal oxide, a transparent conductive material, and the like. These may be used alone or in combination with each other.

As the first, second, and third conductive patterns CE1, CE2, and CE3 partially overlap each other, the second capacitor CAP2 may be located on the first capacitor CAP1. Accordingly, the display device DD having a high resolution may be implemented.

Figure 11:
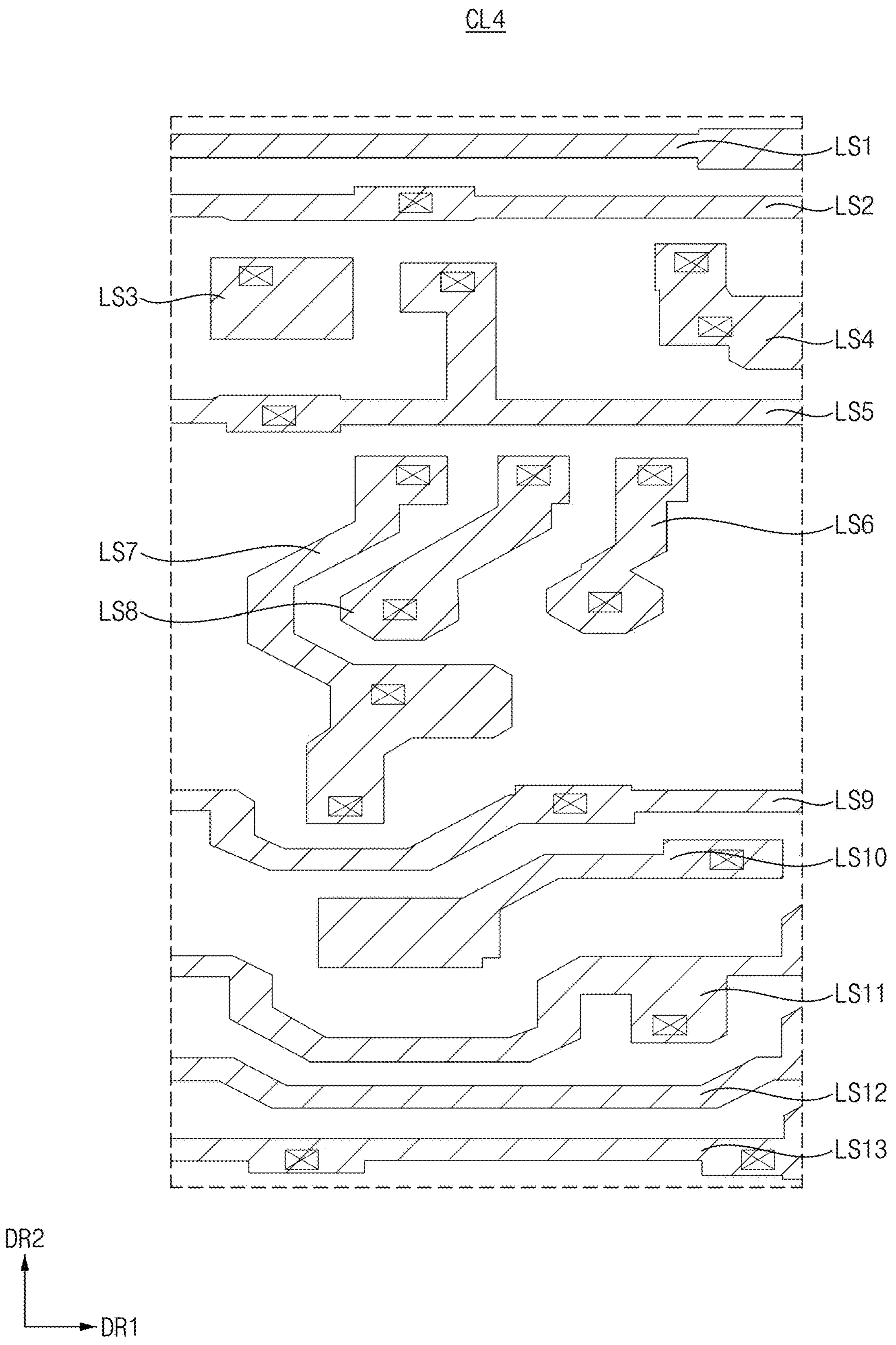
Figure 12:
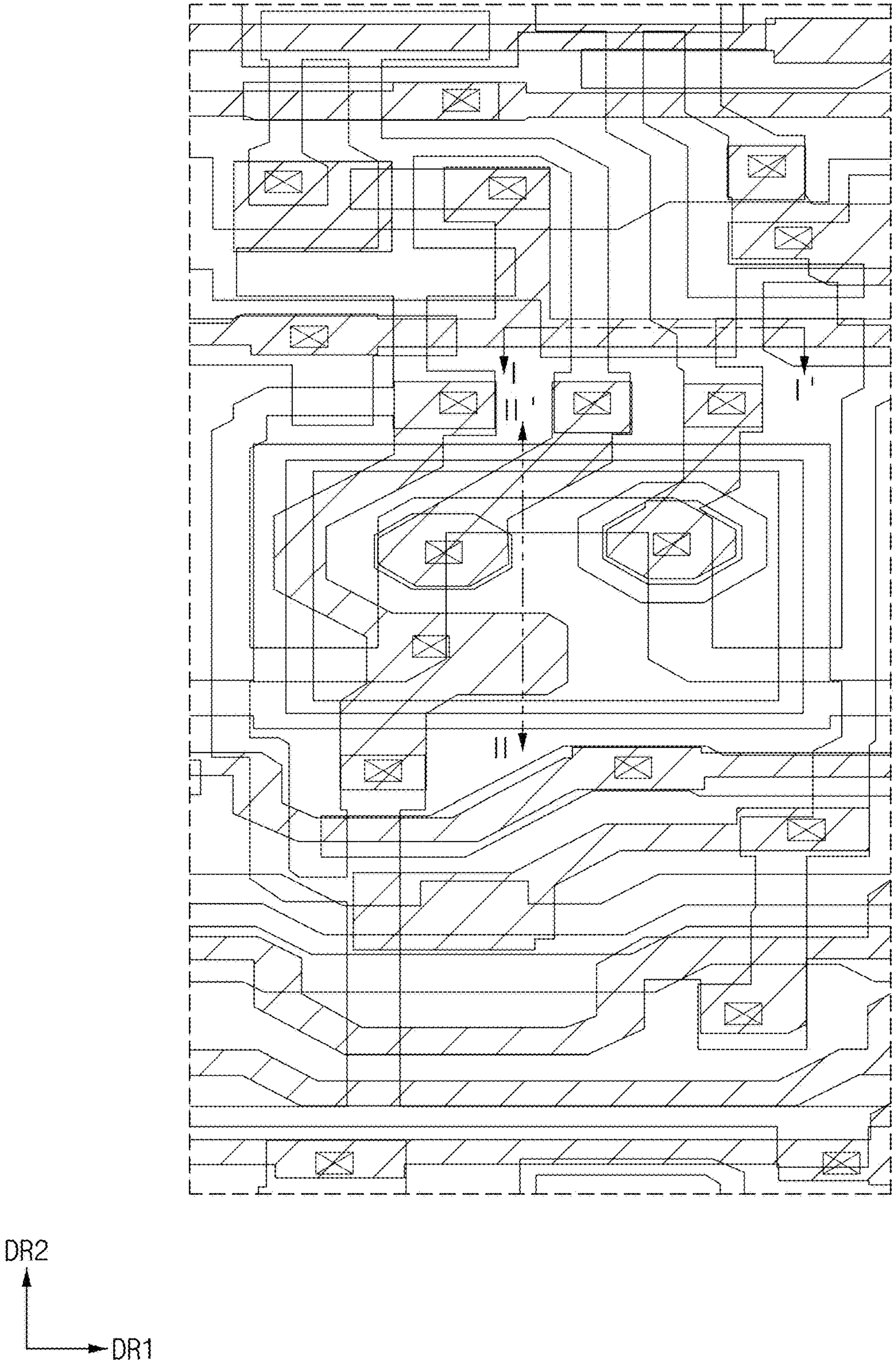

Further referring to FIGS. 11 and 12, the display device DD according to some embodiments of the present disclosure may further include a fourth conductive layer CL4. The fourth conductive layer CL4 may be located on the third conductive layer CL3. For example, a fourth insulating layer covering the third conductive layer CL3 may be located on the third conductive layer CL3, and the fourth conductive layer CL4 may be located on the fourth insulating layer.

The fourth conductive layer CL4 may include first, second, third, fourth, fifth, sixth, seventh, eighth, ninth, tenth, eleventh, twelve, and thirteenth lower source patterns LS1, LS2, LS3, LS4, LS5, LS6, LS7, LS8, LS9, LS10, LS11, LS12, and LS13. The first, second, third, fourth, fifth, sixth, seventh, eighth, ninth, tenth, eleventh, twelve, and thirteenth lower source patterns LS1, LS2, LS3, LS4, LS5, LS6, LS7, LS8, LS9, LS10, LS11, LS12, and LS13 may be located in the same layer and may include the same material.

The first lower source pattern LS1 may extend in the first direction DR1. A data initialization gate signal (e.g., the data initialization gate signal GI of FIG. 2) may be applied to the first lower source pattern LS1. The first lower source pattern LS1 may be connected to the third lower gate pattern LG3 through a contact hole. Accordingly, the data initialization gate signal may be transferred to the third lower gate pattern LG3. When the data initialization gate signal is transmitted, the fourth transistor T4 may be activated. The first lower source pattern LS1 may be referred to as a gate line.

The first lower source pattern LS1 may be adjacent to the second lower source pattern LS2. According to some embodiments, the first lower source pattern LS1 may partially overlap each of the first and second extension parts EP1 and EP2.

The second lower source pattern LS2 may extend in the first direction DR1. A data write signal (e.g., the data write signal GW of FIG. 2) may be applied to the second lower source pattern LS2. The second lower source pattern LS2 may be connected to the first lower gate pattern LG1 through a contact hole. Accordingly, the data write signal may be transferred to the first lower gate pattern LG1. When the data write signal is transmitted, the second transistor T2 may be activated. The second lower source pattern LS2 may be referred to as a gate line.

The second lower source pattern LS2 may be adjacent to the fifth lower source pattern LS5. According to some embodiments, the second lower source pattern LS2 may partially overlap each of the first and second extension parts EP1 and EP2.

A data voltage (e.g., the data voltage VDATA of FIG. 2) may be applied to the third lower source pattern LS3. The third lower source pattern LS3 may be connected to the first extension part EP1 of the active layer AL through a contact hole. Accordingly, the data voltage may be transmitted to the first extension part EP1 of the active layer AL.

The fourth lower source pattern LS4 may be connected to the second middle gate pattern MG2 and the second extension part EP2 of the active layer AL through a contact hole. Accordingly, the first initialization voltage may be transferred to the second extension part EP2 through the fourth lower source pattern LS4. In addition, the second extension part EP2 may be electrically connected to the first conductive pattern CE1 through the sixth lower source pattern LS6. Accordingly, the first initialization voltage applied to the second extension part EP2 may be transferred to the first conductive pattern CE1 through the sixth lower source pattern LS6.

The fifth lower source pattern LS5 may extend in the first direction DR1. A compensation gate signal (e.g., the compensation gate signal GC of FIG. 2) may be applied to the fifth lower source pattern LS5. The fifth lower source pattern LS5 may be connected to the second lower gate pattern LG2, the fourth lower gate pattern LG4, and the fifth lower gate pattern LG5 through a contact hole. Accordingly, the compensation gate signal may be transmitted to the fourth lower gate pattern LG4 and the fifth lower gate pattern LG5. When the compensation gate signal is transmitted, the third transistor T3, the fifth transistor T5, and the tenth transistor T10 may be activated. The fifth lower source pattern LS5 may be referred to as a gate line.

The fifth lower source pattern LS5 may partially overlap the active layer AL. According to some embodiments, the fifth lower source pattern LS5 may partially overlap each of the first extension part EP1 and the second extension part EP2 of the active layer AL.

As described above, at least a part of the fifth transistor T5 may be located on the same line as the third transistor T3 in the first direction DR1 in the plan view. In addition, the fifth lower source pattern LS5 may be connected to the third transistor T3 and the fifth transistor T5. That is, one fifth lower source pattern LS5 may be provided for each pixel circuit PC. Accordingly, the display device DD having a high resolution may be implemented.

The fifth lower source pattern LS5 may be adjacent to the first, second, and third conductive patterns CE1, CE2, and CE3. That is, according to some embodiments, the fifth lower source pattern LS5 may be adjacent to the first and second capacitors CAP1 and CAP2.

According to some embodiments, the sixth lower source pattern LS6 may be connected to the first conductive pattern CE1 through a first contact hole and may be connected to a part of the second extension part EP2 of the active layer AL that does not overlap the first, second, and third conductive patterns CE1, CE2, and CE3 through a second contact hole. Accordingly, the first initialization voltage applied to the fourth lower source pattern LS4 may be transferred to the sixth lower source pattern LS6 through the second extension part EP2.

A high power supply voltage (e.g., the high power supply voltage ELVDD of FIG. 2) may be applied to the seventh lower source pattern LS7. The seventh lower source pattern LS7 may be respectively connected to the first extension part EP1, the active pattern AP, and the third conductive pattern CE3 through a contact hole. Accordingly, the high power voltage may be transmitted to the first extension part EP1, the active pattern AP, and the third conductive pattern CE3.

According to some embodiments, the eighth lower source pattern LS8 may be connected to the second conductive pattern CE2 through a third contact hole and may be connected to a part of the first extension part EP1 of the active layer AL that does not overlap the first, second, and third conductive patterns CE1, CE2, and CE3 through a fourth contact hole. Accordingly, the data voltage applied to the third lower source pattern LS3 may be transferred to the eighth lower source pattern LS8 through the first extension part EP1.

The ninth lower source pattern LS9 may extend in the first direction DR1. A light emitting control signal (e.g., the light emitting control signal EM of FIG. 2) may be applied to the ninth lower source pattern LS9. The ninth lower source pattern LS9 may be connected to the sixth lower gate pattern LG6 through a contact hole. Accordingly, the light emitting control signal may be transmitted to the sixth lower gate pattern LG6. When the light emitting control signal is transmitted, the sixth transistor T6 and the eighth transistor T8 may be activated.

The tenth lower source pattern LS10 may be connected to the active pattern AP through a contact hole.

The eleventh lower source pattern LS11 may extend in the first direction DR1. A second initialization voltage (e.g., the second initialization voltage VINT2 of FIG. 2) may be applied to the eleventh lower source pattern LS11. The eleventh lower source pattern LS11 may be connected to the active pattern AP through a contact hole. Accordingly, the second initialization voltage may be transmitted to the active pattern AP.

The twelfth lower source pattern LS12 may extend in the first direction DR1. The second initialization voltage (e.g., the second initialization voltage VINT2 of FIG. 2) may be applied to the eleventh lower source pattern LS11. For example, the second initialization voltage applied to the eleventh lower source pattern LS11 may be transmitted to another pixel circuit adjacent to the pixel circuit (e.g., the pixel circuit PC of FIG. 14).

The thirteenth lower source pattern LS13 may extend in the first direction DR1. A bias voltage (e.g., the bias voltage VBIAS of FIG. 2) may be applied to the thirteenth lower source pattern LS13. The thirteenth lower source pattern LS13 may be connected to the active pattern AP through a contact hole. Accordingly, the bias voltage may be transmitted to the active pattern AP.

The fourth conductive layer CL4 may include a metal, an alloy, a conductive metal oxide, a transparent conductive material, and the like. These may be used alone or in combination with each other. According to some embodiments, the fourth conductive layer CL4 may include a low-resistance metal. That is, the fifth lower source pattern LS5 may be formed of a low-resistance line.

Figure 13:
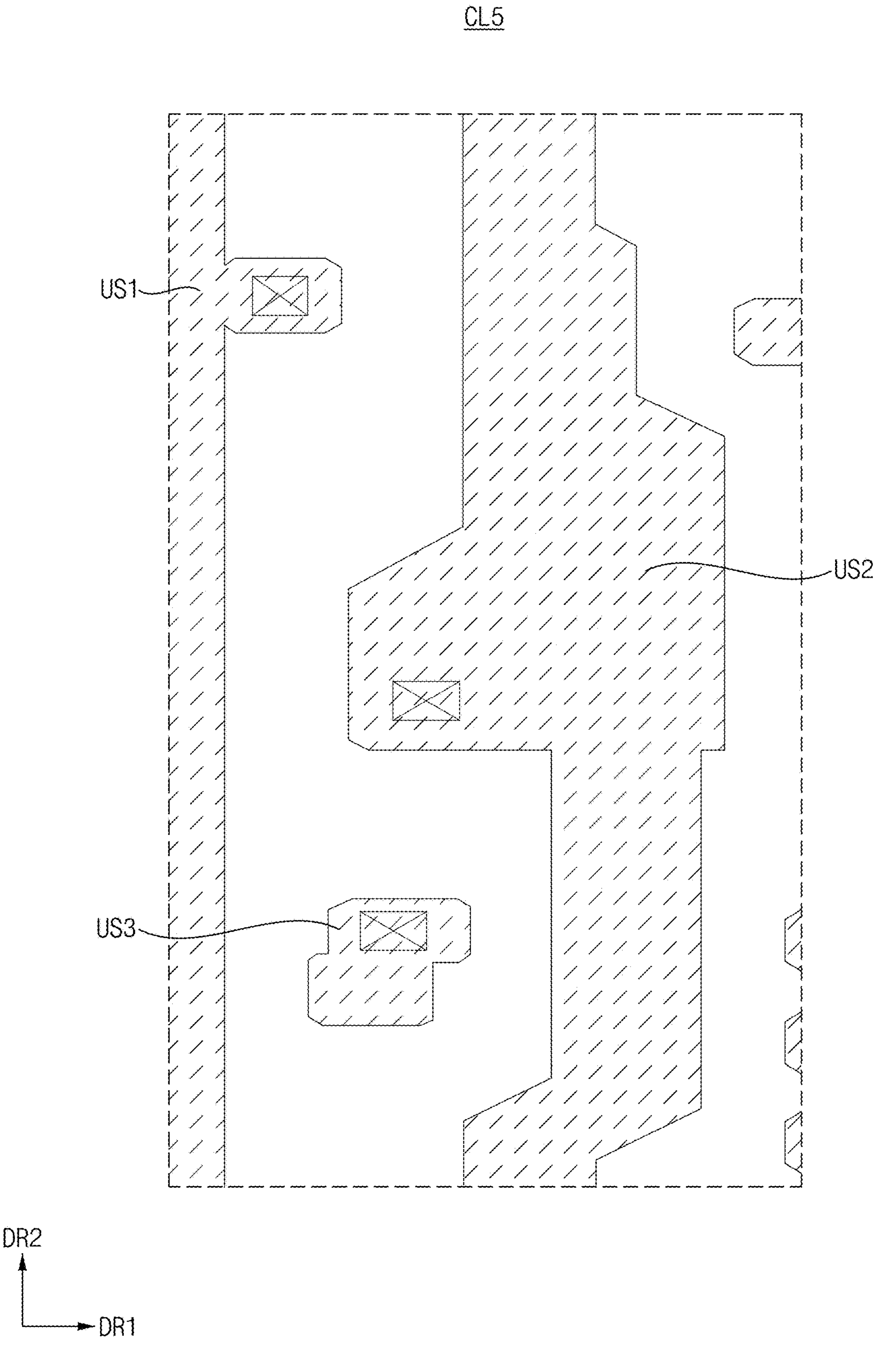
Figure 14:
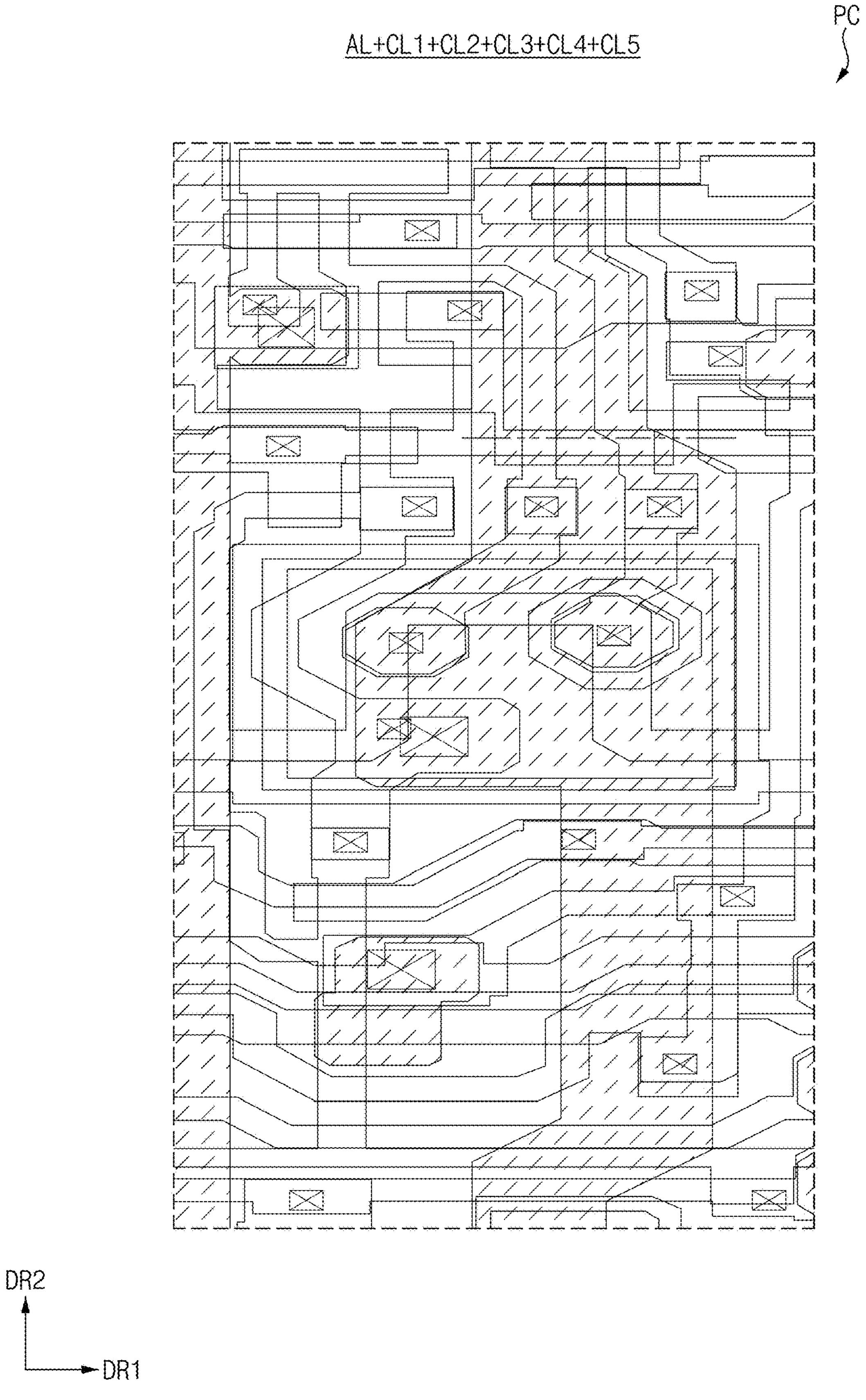

Further referring to FIGS. 13 and 14, the display device DD according to some embodiments may further include a fifth conductive layer CL5. The fifth conductive layer CL5 may be located on the fourth conductive layer CL4. For example, a fifth insulating layer covering the fourth conductive layer CL4 may be located on the fourth conductive layer CL4, and a fifth conductive layer CL5 may be located on the fifth insulating layer.

The fifth conductive layer CL5 may include first, second, and third upper source patterns US1, US2, and US3. The first, second, and third upper source patterns US1, US2, and US3 may be located in the same layer and may include the same material.

The first upper source pattern US1 may extend in the second direction DR2. The data voltage may be applied to the first upper source pattern US1. The first upper source pattern US1 may be connected to the third lower source pattern LS3 through a contact hole. Accordingly, the data voltage may be transferred to the third lower source pattern LS3.

The second upper source pattern US2 may extend in the second direction DR2. The high power supply voltage may be applied to the second upper source pattern US2. The second upper source pattern US2 may be connected to the seventh lower source pattern LS7 through a contact hole. Accordingly, the high power supply voltage may be transferred to the seventh lower source pattern LS7.

The third upper source pattern US3 may be connected to the tenth lower source pattern LS10 through a contact hole. In addition, the light emitting element LED shown in FIG. 3 may be located on the layout view shown in FIG. 14. The third upper source pattern US3 may be connected to the anode electrode of the light emitting element LED.

The fifth conductive layer CL5 may include a metal, an alloy, a conductive metal oxide, a transparent conductive material, and the like. These may be used alone or in combination with each other.

Figure 15:
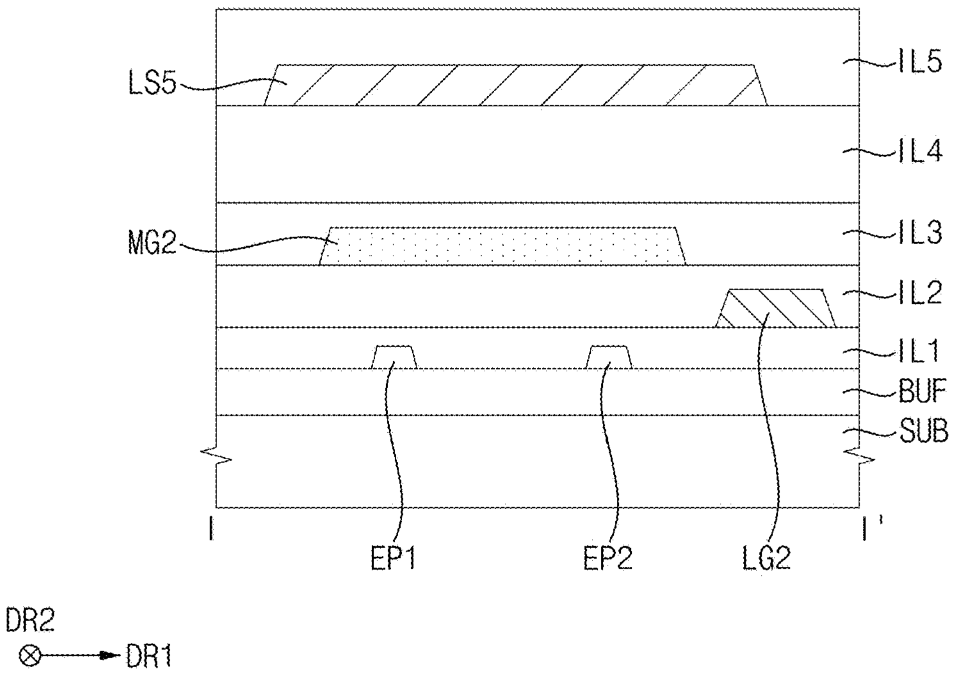
FIG. 15 is a cross-sectional view taken along the line I-I' of FIG. 12.
Figure 16:
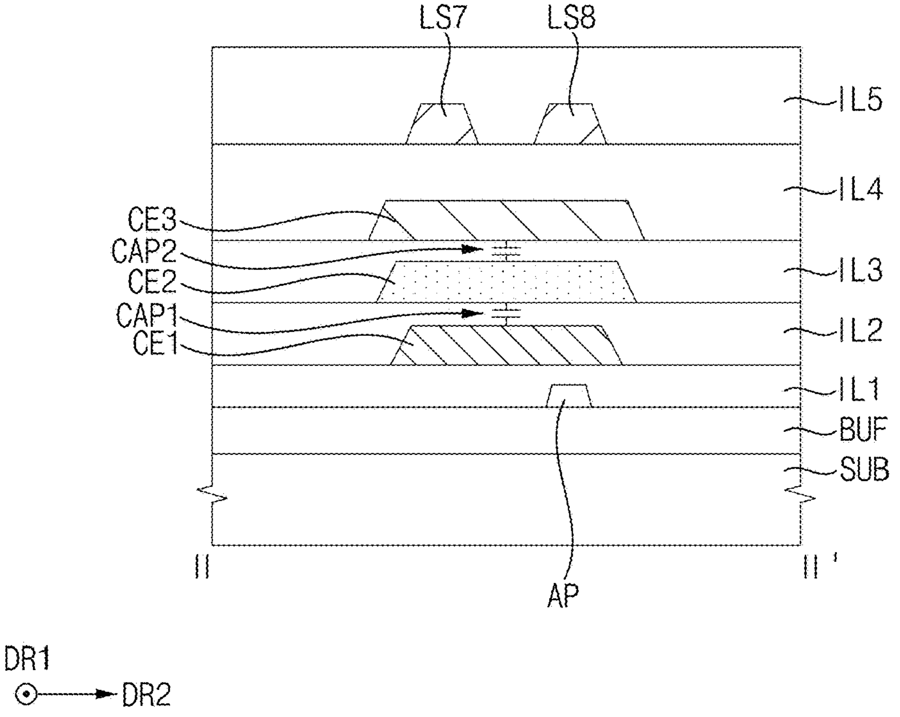
FIG. 16 is a cross-sectional view taken along the line II-II' of FIG. 12.

FIG. 15 is a cross-sectional view taken along the line I-I' of FIG. 12. FIG. 16 is a cross-sectional view taken along the line II-II' of FIG. 12. Hereinafter, descriptions overlapping those of the display device DD described with reference to FIGS. 4, 5, 6, 7, 8, 9, 10, 11, 12, 13, and 14 will be omitted or simplified.

Referring to FIGS. 15 and 16, a buffer layer BUF may be located on the substrate SUB. The buffer layer BUF may prevent diffusion of impurities from the substrate SUB to an active layer (e.g., the active layer AL of FIG. 4). In addition, the buffer layer BUF may control the transfer rate of heat generated in the process of forming the active layer. Thus, the active layer may be uniformly formed. For example, the buffer layer BUF may include an inorganic material such as silicon oxide, silicon nitride, silicon oxynitride, and the like. These may be used alone or in combination with each other.

The active layer may be located on the buffer layer BUF. The active layer may include the first extension part EP1, the second extension part EP2, and the active pattern AP.

A first insulating layer IL1 may be located on the buffer layer BUF. The first insulating layer IL1 may cover the active layer. For example, the first insulating layer IL1 may include an inorganic material such as silicon oxide, silicon nitride, silicon oxynitride, and the like. These may be used alone or in combination with each other.

The first conductive pattern CE1 may be located on the first insulating layer IL1. The first conductive pattern CE1 may partially overlap the active pattern AP. A second insulating layer IL2 may be located on the first insulating layer IL1. The second insulating layer IL2 may cover the first conductive pattern CE1. For example, the second insulating layer IL2 may include an inorganic material such as silicon oxide, silicon nitride, silicon oxynitride, and the like. These may be used alone or in combination with each other.

The second conductive pattern CE2 may be located on the second insulating layer IL2. The second conductive pattern CE2 may partially overlap the first conductive pattern CE1. The second conductive pattern CE2 and the first conductive pattern CE1 may constitute the first capacitor CAP1.

A third insulating layer IL3 may be located on the second insulating layer IL2. The third insulating layer IL3 may cover the second conductive pattern CE2. For example, the third insulating layer IL3 may include an inorganic material such as silicon oxide, silicon nitride, silicon oxynitride, and the like. These may be used alone or in combination with each other.

The third conductive pattern CE3 may be located on the third insulating layer IL3. The third conductive pattern CE3 may partially overlap the second conductive pattern CE2. The third conductive pattern CE3 and the second conductive pattern CE2 may constitute the second capacitor CAP2.

A fourth insulating layer IL4 may be located on the third insulating layer IL3. The fourth insulating layer IL4 may cover the third conductive pattern CE3. For example, the fourth insulating layer IL4 may include an inorganic material such as silicon oxide, silicon nitride, silicon oxynitride, and the like. These may be used alone or in combination with each other.

The fifth lower source pattern LS5 may be located on the fourth insulating layer IL4. The compensation gate signal (e.g., compensation gate signal GC of FIG. 2) may be applied to the fifth lower source pattern LS5. According to some embodiments, the fifth lower source pattern LS5 may partially overlap each of the first extension part EP1 and the second extension part EP2.

A fifth insulating layer IL5 may be located on the fourth insulating layer IL4. The fifth insulating layer IL5 may cover the fifth lower source pattern LS5. For example, the fifth insulating layer IL5 may include an organic material such as photoresist, polyacrylic resin, polyimide resin, polyamide resin, siloxane resin, acrylic resin, epoxy resin, and the like. These may be used alone or in combination with each other.

Referring back to FIGS. 4, 5, 6, 7, 8, 9, 10, 11, 12, 13, and 14, the display device DD according to some embodiments of the present disclosure may include the active layer AL continuously extending on the substrate SUB, a first switching transistor (i.e., the fifth transistor T5) including a part of the active layer AL, a second switching transistor (i.e., the third transistor T3) including a part of the active layer AL and located in a same plane as at least a part of the first switching transistor in the first direction DR1 in the plan view, and a gate line (i.e., the fifth lower source pattern LS5) extending in the first direction DR1, connected to a gate electrode of each of the first and second switching transistors, and to which the compensation gate signal is applied. That is, one gate line may be provided for each pixel circuit PC. Accordingly, deterioration of characteristics of a transistor due to generation of static electricity may be prevented. In addition, the display device DD having a high resolution may be implemented.

Figure 17:
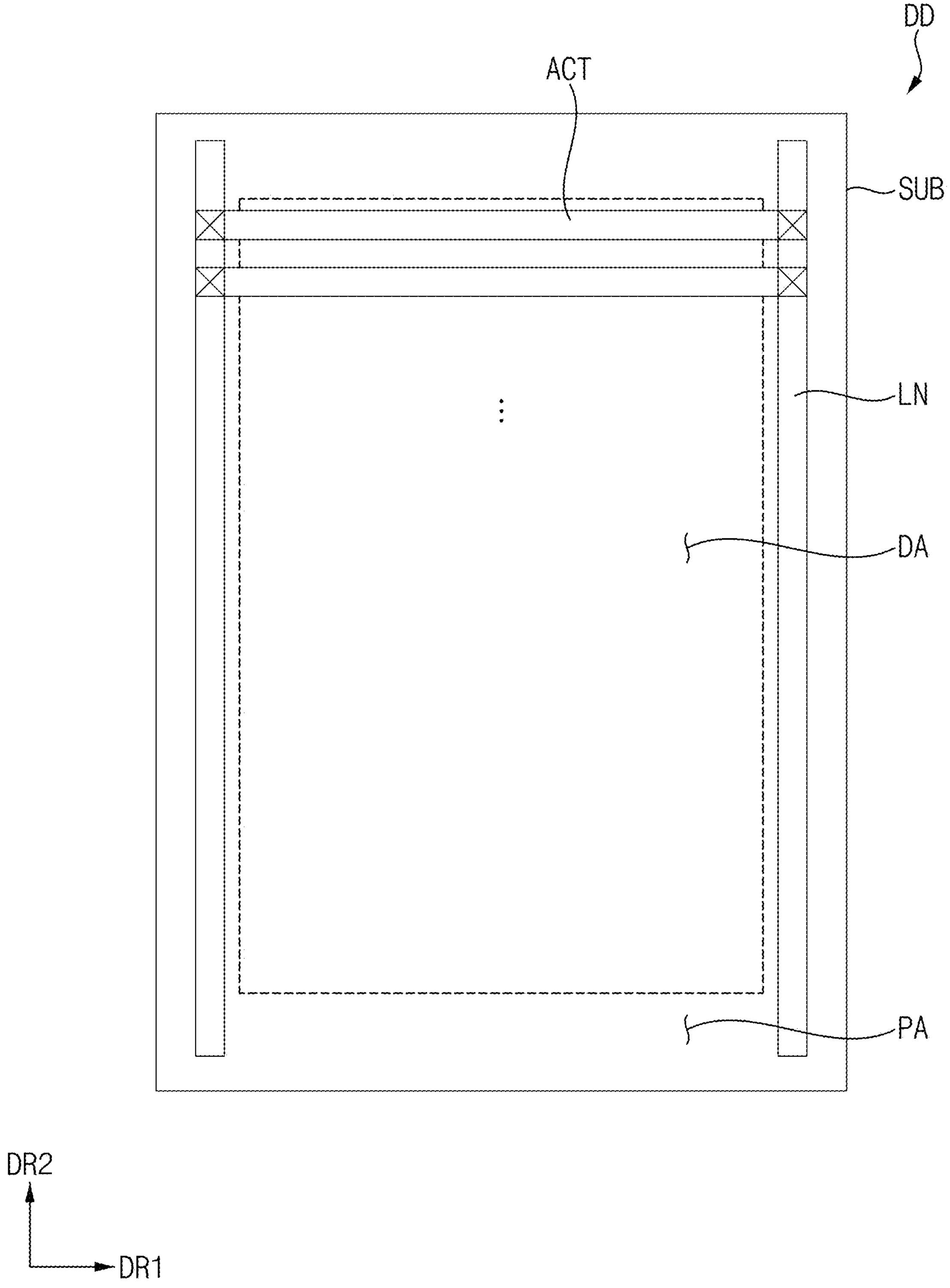
FIG. 17 is a plan view illustrating an active layer and a transmission line included in a display device according to some embodiments.

FIG. 17 is a plan view illustrating an active layer and a transmission line included in a display device according to some embodiments. For example, the active layer AL of FIG. 17 may correspond to the active layer AL of FIG. 4.

Referring to FIG. 17, the display device DD may include a display area DA and a peripheral area PA. A plurality of pixels (e.g., a plurality of pixels PX in FIG. 1) may be arranged in the display area DA, and an image may be displayed. The peripheral area PA may surround at least a part of the display area DA. As the display device DD includes the display area DA and the peripheral area PA, the substrate SUB may also include the display area DA and the peripheral area PA.

The display device DD may include a transfer line LN located in the peripheral area PA on the substrate SUB. The transfer line LN may extend in the second direction DR2. For example, the transfer line LN may be located in the peripheral area PA adjacent to both sides of the display area DA. According to some embodiments, a DC power supply voltage may be applied to the transfer line LN. For example, the DC power supply voltage may be a bias voltage.

According to some embodiments, the active layer AL may be connected to the transfer line LN in the first direction DR1. For example, the active layer AL may be connected to the transfer line LN through a contact hole. Alternatively, the active layer AL may be directly connected to the transfer line LN. Accordingly, the DC power supply voltage may be transferred to the active layer AL.

Figure 18:
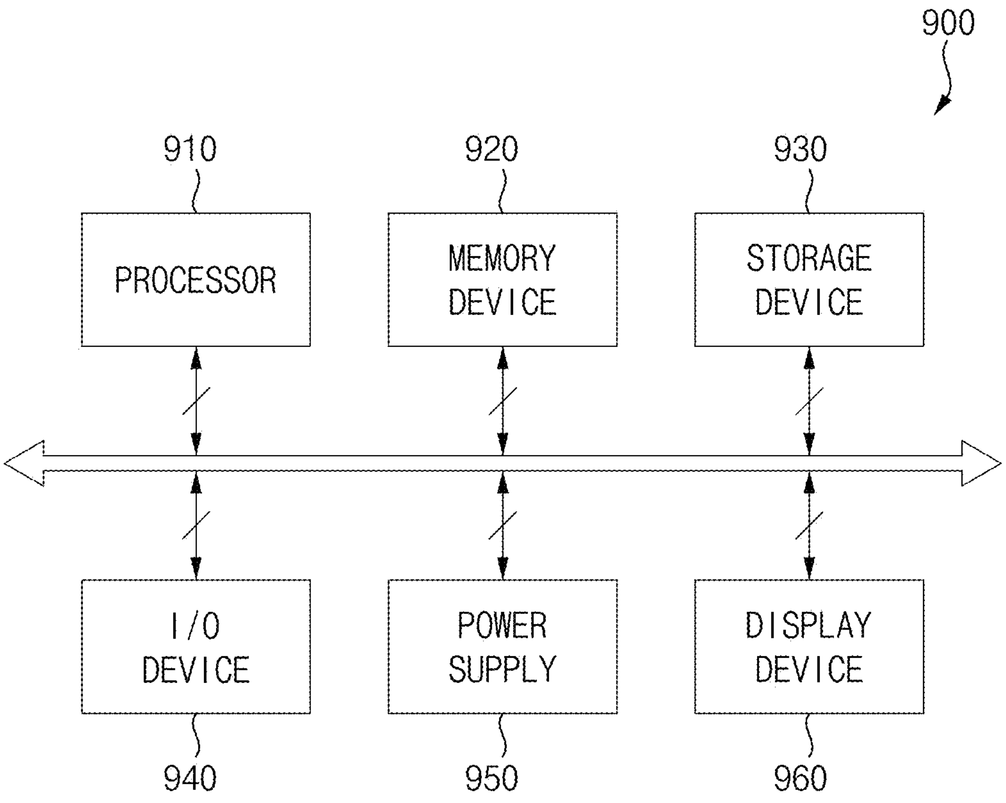
FIG. 18 is a block diagram illustrating an electronic device including the display device of FIG. 1.
Figure 19:
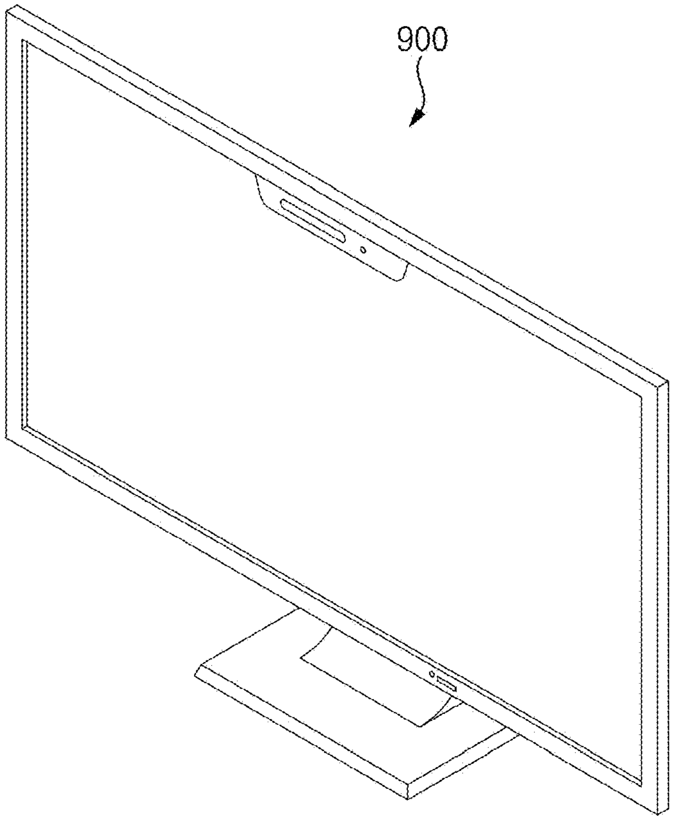
FIG. 19 is a view illustrating an example in which the electronic device of FIG. 18 is implemented as a television.
Figure 20:
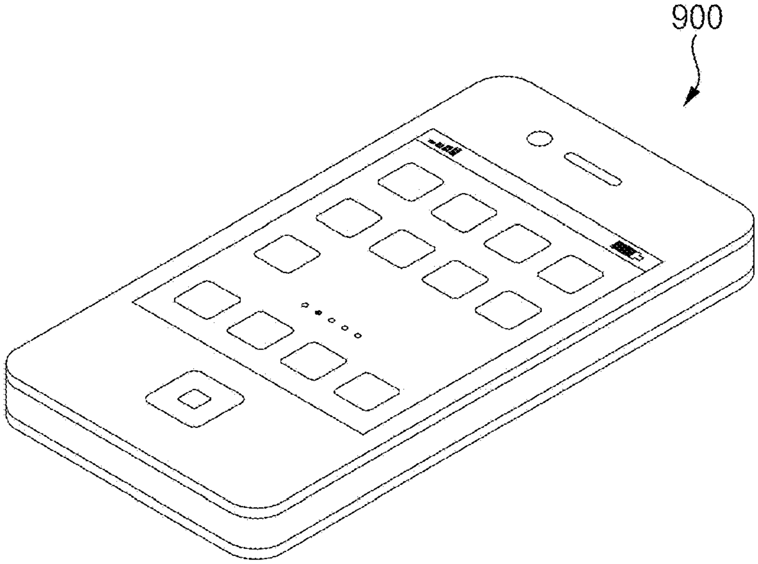
FIG. 20 is a view illustrating an example in which the electronic device of FIG. 18 is implemented as a smart phone.

FIG. 18 is a block diagram illustrating an electronic device including the display device of FIG. 1. FIG. 19 is a view illustrating an example in which the electronic device of FIG. 18 is implemented as a television. FIG. 20 is a view illustrating an example in which the electronic device of FIG. 18 is implemented as a smart phone.

Referring to FIGS. 18, 19, and 20, according to some embodiments, an electronic device 900 may include a processor 910, a memory device 920, a storage device 930, an input/output device 940, a power supply 950, and a display device 960. In this case, the display device 960 may correspond to the display device DD described with reference to FIGS. 1 to 17. The electronic device 900 may further include several ports capable of communicating with a video card, a sound card, a memory card, a USB device, and the like.

According to some embodiments, as shown in FIG. 19, the electronic device 900 may be implemented as a television. According to some embodiments, as shown in FIG. 20, the electronic device 900 may be implemented as a smart phone. However, the electronic device 900 is not limited thereto, and for example, the electronic device 900 may be implemented as a mobile phone, a video phone, a smart pad, a smart watch, a tablet PC, a vehicle navigation device, a computer monitor, a laptop computer, a head mounted display (HMD), and the like.

The processor 910 may perform certain calculations or tasks. According to some embodiments, the processor 910 may be a microprocessor, a central processing unit (CPU), an application processor (AP), and/or the like. The processor 910 may be connected to other components through an address bus, a control bus, a data bus, and the like. The processor 910 may also be connected to an expansion bus, such as a peripheral component interconnect (PCI) bus.

The memory device 920 may store data necessary for the operation of the electronic device 900. For example, the memory device 920 may include an erasable programmable read-only memory (EPROM) device, an electrically erasable programmable read-only memory (EEPROM) device, a flash memory device, a phase change random access memory (PRAM) device, a resistance random access memory (RRAM) device, a nano floating GEe memory (NFGM) device, a polymer random access memory (PoRAM) device, a magnetic random access memory (MRAM) device, a non-volatile memory device such as a ferroelectric random access memory (FRAM) device and/or a volatile memory device such as a dynamic random access memory (DRAM) device, a static random access memory (SRAM) device, and a mobile DRAM device, and the like.

The storage device 930 may include a solid state drive (SSD), a hard disk drive (HDD), a CD-ROM, and the like.

The input/output device 940 may include input means such as a keyboard, keypad, touch pad, touch screen, mouse, and the like and output means such as a speaker, a printer, and the like.

The power supply 950 may supply power necessary for the operation of the electronic device 900. The display device 960 may be connected to other components through buses or other communication links. According to some embodiments, the display device 960 may be included in the input/output device 940.

The present disclosure can be applied to various display devices. For example, the present invention can be applied to high-resolution smartphones, mobile phones, smart pads, smart watches, tablet PCs, vehicle navigation systems, televisions, computer monitors, laptops, and the like.

The foregoing is illustrative of embodiments and is not to be construed as limiting thereof. Although a few embodiments have been described, those skilled in the art will readily appreciate that many modifications are possible in the embodiments without materially departing from the novel teachings and characteristics of embodiments according to the present inventive concept. Accordingly, all such modifications are intended to be included within the scope of embodiments of the present inventive concept as defined in the claims, and their equivalents. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, and their equivalents.

What is claimed is:

1. A display device comprising:

an active layer on a substrate;

a first switching transistor including a part of the active layer;

a second switching transistor including a part of the active layer and positioned in a first direction from the first switching transistor;

a first capacitor on the active layer and connected to the first switching transistor and the second switching transistor;

a second capacitor on the active layer, connected to the first switching transistor, and at least partially overlapping the first capacitor in a plan view; and a first gate line extending in the first direction and connected to a gate electrode of each of the first and second switching transistors.

2. The display device of claim 1, wherein the active layer includes:

an active pattern partially overlapping the first and second capacitors;

a first extension part connected to the active pattern; and a second extension part connected to the active pattern and spaced apart from the first extension part in the first direction, and wherein the first switching transistor includes a part of the first extension part and the second switching transistor includes a part of the second extension part.

3. The display device of claim 2, further comprising:

a second gate line adjacent to the first gate line and extending in the first direction; and a third gate line adjacent to the second gate line and extending in the first direction, wherein the second and third gate lines partially overlap the first and second extension parts, respectively.

4. The display device of claim 3, further comprising:

a third switching transistor including a part of the first extension part; and a fourth switching transistor including a part of the second extension part, wherein the second gate line is connected to a gate electrode of the third switching transistor and the third gate line is connected to a gate electrode of the fourth switching transistor, and wherein the second gate line is configured to receive a data write signal and the third gate line is configured to receive a data initialization gate signal.

5. The display device of claim 2, wherein the first gate line partially overlaps each of the first and second extension parts.

6. The display device of claim 1, wherein the active layer continuously extends on the substrate.

7. The display device of claim 1, wherein the first gate line is configured to receive a compensation gate signal.

8. The display device of claim 1, wherein the first capacitor is a storage capacitor and the second capacitor is a hold capacitor.

9. The display device of claim 1, wherein the first gate line is adjacent to the first and second capacitors.

10. The display device of claim 1, further comprising:

a transfer line in a peripheral area surrounding at least a part of a display area of the substrate, extending in a second direction crossing the first direction, and configured to receive a DC power supply voltage, wherein the active layer is connected to the transfer line in the first direction.

11. A display device comprising:

an active layer on a substrate;

a driving transistor including a part of the active layer and configured to generate a driving current;

a first switching transistor including a part of the active layer and connected to the driving transistor;

a second switching transistor including a part of the active layer;

a first capacitor on the active layer and connected to the second switching transistor;

a second capacitor on the first capacitor and at least partially overlapping the first capacitor in a plan view; and a first gate line extending in a first direction and connected to a gate electrode of each of the first and second switching transistors.

12. The display device of claim 11, wherein the active layer includes:

an active pattern partially overlapping the first and second capacitors;

a first extension part connected to the active pattern; and a second extension part connected to the active pattern and spaced apart from the first extension part in the first direction, and wherein the first switching transistor includes a part of the first extension part and the second switching transistor includes a part of the second extension part.

13. The display device of claim 12, further comprising:

a second gate line adjacent to the first gate line and extending in the first direction; and a third gate line adjacent to the second gate line and extending in the first direction, wherein the second and third gate lines partially overlap the first and second extension parts, respectively.

14. The display device of claim 13, further comprising:

a fourth switching transistor including a part of the first extension part; and a fifth switching transistor including a part of the second extension part, wherein the second gate line is connected to a gate electrode of the fourth switching transistor and the third gate line is connected to a gate electrode of the fifth switching transistor, and wherein the second gate line is configured to receive a data write signal and the third gate line is configured to receive a data initialization gate signal.

15. The display device of claim 12, wherein the first gate line partially overlaps each of the first and second extension parts.

16. The display device of claim 11, further comprising:

a third switching transistor including a part of the active layer and connected to the first capacitor and the second capacitor, wherein the first gate line is connected to a gate electrode of the third switching transistor.

17. The display device of claim 11, wherein the active layer continuously extends on the substrate.

18. The display device of claim 11, wherein the first gate line is configured to receive a compensation gate signal.

19. The display device of claim 11, wherein the first gate line is adjacent to the first and second capacitors.

20. An electronic device comprising:

a display device;

a processor configured to control the display device; and a power supply configured to supply power to the display device, wherein the display device includes:

an active layer on a substrate;

a driving transistor including a part of the active layer and configured to generate a driving current;

a first switching transistor including a part of the active layer and connected to the driving transistor;

a second switching transistor including a part of the active layer;

a first capacitor on the active layer and connected to the second switching transistor;

a second capacitor on the first capacitor and at least partially overlapping the first capacitor in a plan view; and a first gate line extending in a first direction and connected to a gate electrode of each of the first and second switching transistors.

* * * * *